United States Patent
Sato et al.

(10) Patent No.: US 8,214,458 B2
(45) Date of Patent: Jul. 3, 2012

(54) TRANSMITTER APPARATUS AND TRANSMITTING METHOD

(75) Inventors: Junichi Sato, Machida (JP); Tomoaki Itoh, Tokyo (JP); Takao Yamaguchi, Neyagawa (JP); Ichiro Takei, Tokyo (JP); Daiji Ido, Tokyo (JP)

(73) Assignee: Panasonic Corporation, Osaka (JP)

( * ) Notice: Subject to any disclaimer, the term of this patent is extended or adjusted under 35 U.S.C. 154(b) by 1238 days.

(21) Appl. No.: 10/548,081

(22) PCT Filed: Feb. 24, 2004

(86) PCT No.: PCT/JP2004/002123
§ 371 (c)(1),
(2), (4) Date: Sep. 6, 2005

(87) PCT Pub. No.: WO2004/081798
PCT Pub. Date: Sep. 23, 2004

(65) Prior Publication Data
US 2006/0156360 A1    Jul. 13, 2006

(30) Foreign Application Priority Data
Mar. 11, 2003 (JP) ................................. 2003-065670

(51) Int. Cl.
*G06F 15/16* (2006.01)
(52) U.S. Cl. .......................... 709/218; 709/227; 709/228
(58) Field of Classification Search .................. 709/227, 709/228, 218
See application file for complete search history.

(56) References Cited

U.S. PATENT DOCUMENTS

| | | | |
|---|---|---|---|
| 6,023,714 A | 2/2000 | Hill et al. | |
| 6,345,279 B1 | 2/2002 | Li et al. | |
| 6,542,736 B1* | 4/2003 | Parkvall et al. | ............ 455/452.2 |
| 6,965,604 B1 | 11/2005 | Sato et al. | |
| 7,020,839 B1 | 3/2006 | Hosoda | |
| 7,251,778 B1 | 7/2007 | Hill et al. | |
| 7,310,628 B2 | 12/2007 | Sugimoto et al. | |
| 2002/0059571 A1 | 5/2002 | Negishi et al. | |
| 2002/0107850 A1 | 8/2002 | Sugimoto et al. | |
| 2005/0088972 A1* | 4/2005 | Zhang et al. | .................. 370/235 |
| 2005/0170848 A1 | 8/2005 | Sato et al. | |
| 2006/0198438 A1 | 9/2006 | Negishi et al. | |

FOREIGN PATENT DOCUMENTS

| | | |
|---|---|---|
| CN | 1336059 | 2/2002 |
| EP | 1102178 | 5/2001 |
| JP | 9-319632 | 12/1997 |
| JP | 2001-024996 A | 1/2001 |

(Continued)

OTHER PUBLICATIONS

English language Abstract of CN 1336059.

(Continued)

*Primary Examiner* — Adnan Mirza
(74) *Attorney, Agent, or Firm* — Greenblum & Bernstein, P.L.C.

(57) ABSTRACT

The present invention is intended to realize a screen configuration according to a propagation environment and display capability by causing a server to transmit a plurality of pieces of screen configuration information describing a spatial arrangement of contents to a reception terminal and select, when the reception terminal receives a plurality of pieces of screen configuration information, screen configuration information and display the contents according to the propagation environment of the reception terminal and conditions such as display capability.

20 Claims, 20 Drawing Sheets

FOREIGN PATENT DOCUMENTS

| | | |
|---|---|---|
| JP | 2001-103320 A | 4/2001 |
| JP | 2001-134518 | 5/2001 |
| JP | 2001-243496 A | 9/2001 |
| JP | 2001-357008 A | 12/2001 |
| JP | 2002-123459 A | 4/2002 |
| JP | 2002-297538 | 10/2002 |
| JP | 2002-351781 | 12/2002 |
| JP | 2003-069759 A | 3/2003 |
| WO | 01/53962 | 7/2001 |

OTHER PUBLICATIONS

English Language Abstract of JP 2001-134518.
English Language Abstract of JP 2002-297538.
English Language Abstract of JP 2002-351781.
"Real Time Streaming Protocol (RTSP) (RFC 2326)," retrieved from <URL: http://www.faqs.org/rfcs/rfc2326.html >.
"SDP: Session Description Protocol (RFC 2327)," retrieved from <URL:http://www.faqs.org/rfcs/rfc2327.html >.
"Synchronized Multimedia Integration Language (SMIL 2.0) W3C Recommendation," retrieved from <URL: http://www.w3.org/TR/2001/REC-smil20-20010807/ >.
U.S. Appl. No. 10/523,724 to Sato et al., filed Feb. 7, 2005.
U.S. Appl. No. 10/525,826 to Taniguchi et al., filed Feb. 25, 2005.
English language Abstract of JP 9-319632.
English language Abstract and partial translation of JP 2002-123459 A, Apr. 26, 2002.
English language Abstract of JP 2001-024996 A, Jan. 26, 2001.
English language Abstract of JP 2001-243496 A, Sep. 7, 2001.
English language Abstract of JP 2001-103320 A, Apr. 13, 2001.
English language Abstract of JP 2001-357008 A, Dec. 26, 2001.
English language Abstract of JP 2003-069759 A, Mar. 7, 2003.

* cited by examiner

```
① <smil>
② <head>
③ <layout>
④ <root-layout width="320" height="480" />
⑤ <region id="v" top="5" />
⑥ <region id="t" top="10" />
⑦ <region id="i" top="20" />
⑧ </layout>
⑨ </head>
⑩ </body>
⑪ <par>
⑫ <video region="v" src="rtsp://server/sample.mp4/track-ID=1 begin="3s"
   end="20s"/>
⑬ <audio src="rtsp://server/sample.mp4/track-ID=2 begin="3s" end="20s"/>
⑭ <text region="t" src="http://server/text.txt" dur="10s" />
⑮ <image region="i" src="http://server/image.jpg" dur="10s" />
⑯ </par>
⑰ </body>
⑱ </smil>
```

FIG. 1
(PRIOR ART)

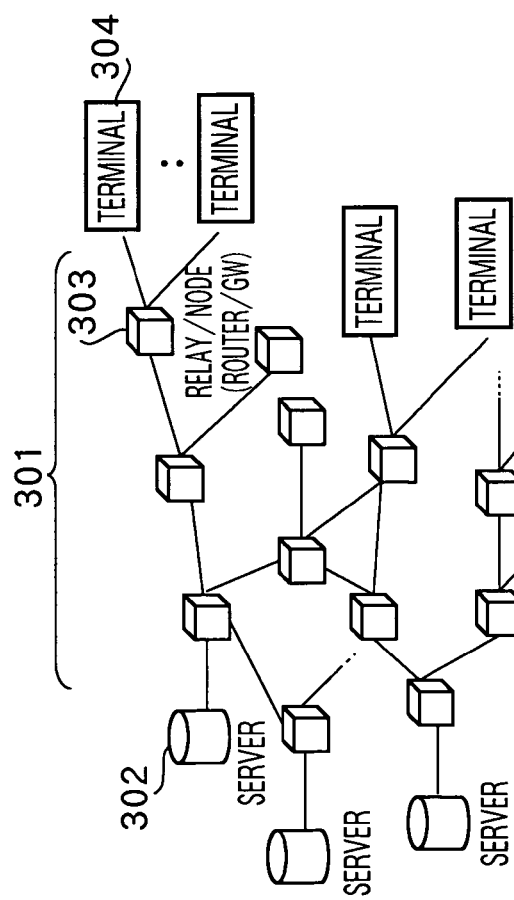
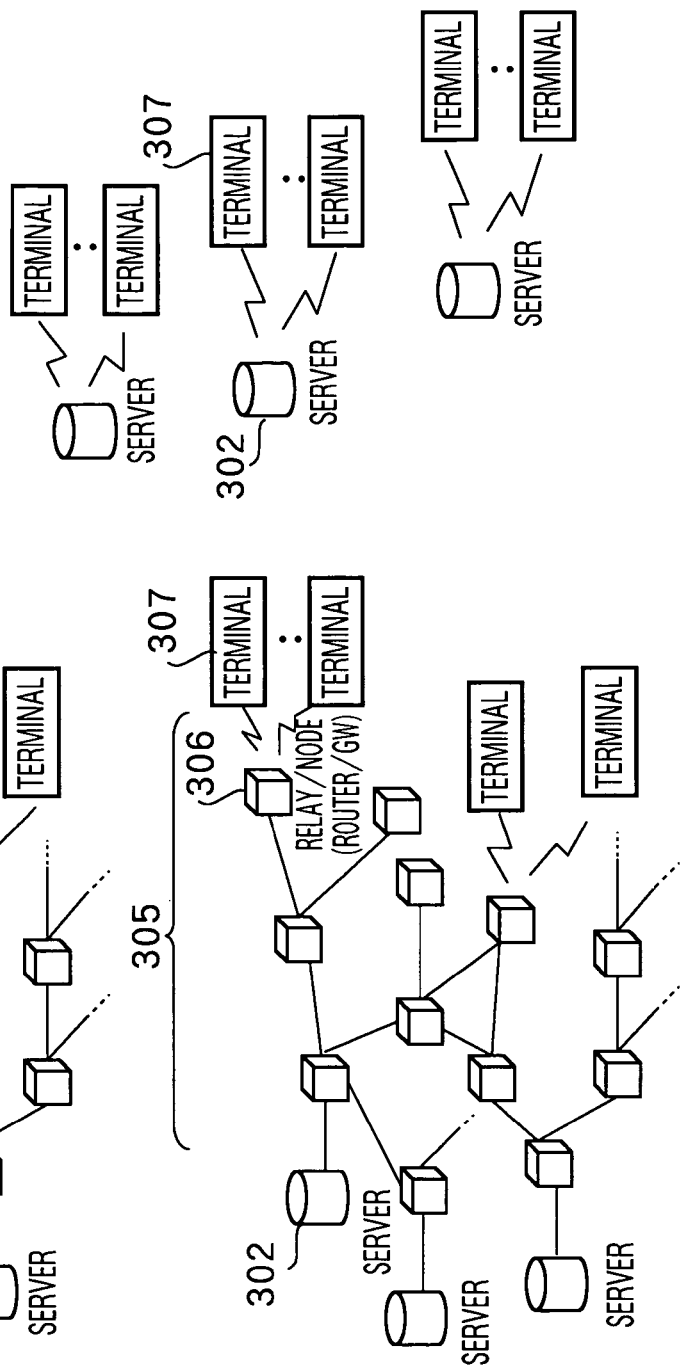

```
400
─────────────────────────────────────────────
v=0
o=mhandley 2890844526 2890842807 IN IP4 126.16.64.4   ⎫
s=SDP Seminar                                          ⎪
i=A Seminar on the session description protocol        ⎪
u=http://www.cs.ucl.ac.uk/staff/M.Handley/sdp.03.ps    ⎬ 401
e=mjh@isi.edu (Mark Handley)                           ⎪
c=IN IP4 244.2.17.12/127                               ⎪
t=2873397496 2873404696                                ⎭
a=recvonly                          ·········· 402
m=audio 49170 RTP/AVP 0             ·········· 403
a=id:audio1
m=video 51372 RTP/AVP 31            ·········· 404
a=id:video1
m=application 32416 udp wb          ·········· 405
a=id:text1
m=application 32417 udp wb          ·········· 406
a=id:image1
m=application 32418 udp wb          ·········· 407
a=id:layout1
```

FIG. 6

```
500            layout1

<smil>
<head>
<layout>
  <root-layout width="320" height="480" />
  <region id="video" top="100" left="10" width="300" height="300" />  ········ 501
  <region id="text"  top="0"   left="10" width="300" height="100" />  ········ 502
  <region id="image" top="400" left="10" width="300" height="80"  />  ········ 503
                                                                      ········ 504
</layout>
</head>
<body>
<par>
  <video region="video" src="video1" />   ········ 505
  <audio                src="audio1" />   ········ 506
  <text  region="text"  src="text1"  />   ········ 507
  <img   region="image" src="image1" />   ········ 508
</par>
</body>
</smil>
```

```
800    layout2
<smil>
<head>
<layout>
  <root-layout width="320" height="480" />
  <region id="video" top="100" left="10" width="300" height="300" />  ······ 501
  <region id="text"  top="0"   left="10" width="300" height="100" />  ······ 502
  <region id="image" top="400" left="10" width="300" height="80" />   ······ 503
                                                                       ······ 504
</layout>
</head>
<body>
<par>
  <text  region="video" src="text2" />   ······ 805
  <audio                src="audio1" />  ······ 506
  <text  region="text"  src="text1" />   ······ 507
  <img   region="image" src="image1" />  ······ 508
</par>
</body>
</smil>
```

FIG.10B

```
810    layout3
12c12
<   <text  region="video" src="text2" />    ······ 811
---                                          ······ 812
>   <video region="video" src="video1" />   ······ 813
```

900

```
v=0
o=mhandley 2890844526 2890842807 IN IP4 126.16.64.4
s=SDP Seminar
i=A Seminar on the session description protocol
u=http://www.cs.ucl.ac.uk/staff/M.Handley/sdp.03.ps
e=mjh@isi.edu (Mark Handley)
c=IN IP4 244.2.17.12/127
t=2873397496 2873404696
a=recvonly
m=audio 49170 RTP/AVP 0
a=id:audio1
m=video 51372 RTP/AVP 31
a=id:video1
m=application 32416 udp wb
a=id:text1                                    ·········· 901
m=application 32417 udp wb
a=id:text2                                    ·········· 902
m=application 32418 udp wb
a=id:image1                                   ·········· 903
m=application 32419 udp wb
a=id:layout2                                  ·········· 904
a=bandwidth: − 96000                          ·········· 905
a=priority:3                                  ·········· 906
m=application 32420 udp wb
a=id:layout3                                  ·········· 907
a=diff:layout2                                ·········· 908
a=bandwidth:64001 − 384000                    ·········· 909
a=priority:4                                  ·········· 910
```

```
v=0
o=mhandley 2890844526 2890842807 IN IP4 126.16.64.4
s=SDP Seminar
i=A Seminar on the session description protocol
u=http://www.cs.ucl.ac.uk/staff/M.Handley/sdp.03.ps
e=mjh@isi.edu (Mark Handley)
c=IN IP4 244.2.17.12/127
t=2873397496 2873404696
a=id:program1                          ---------- 1001
a=bandwidth:64001 − 384000             ---------- 1002
a=priority:4                           ---------- 1003
a=recvonly
m=audio 49170 RTP/AVP 0
a=id:audio1                            ---------- 1004
m=video 51372 RTP/AVP 31
a=id:video1                            ---------- 1005
m=application 32416 udp wb
a=id:text1                             ---------- 1006
m=application 32417 udp wb
a=id:image1                            ---------- 1007
m=application 32420 udp wb
a=id:layout1                           ---------- 1008
```

```
v=0
o=mhandley 2890844526 2890842807 IN IP4 126.16.64.4
s=SDP Seminar
i=A Seminar on the session description protocol
u=http://www.cs.ucl.ac.uk/staff/M.Handley/sdp.03.ps
e=mjh@isi.edu (Mark Handley)
c=IN IP4 244.2.17.12/127
t=2873397496 2873404696
a=id:program2                          ------- 1101
a=bandwidth: − 96000                   ------- 1102
a=priority:3                           ------- 1103
a=recvonly
m=application 32416 udp wb
a=id:text1                             ------- 1104
m=application 32417 udp wb
a=id:text2                             ------- 1105
m=application 32418 udp wb
a=id:image1                            ------- 1106
m=application 32419 udp wb
a=id:layout2                           ------- 1107
```

```
v=0
o=mhandley 2890844526 2890842807 IN IP4 126.16.64.4
s=SDP Seminar
t=2873397496 2873404696
a=id:program3                           ------- 1201
a=diff:program2                         ------- 1202
a=bandwidth:64001 — 384000              ------- 1203
a=priority:4                            ------- 1204
a=recvonly
m=audio 49170 RTP/AVP 0
a=id:audio1                             ------- 1205
m=video 51372 RTP/AVP 31
a=id:video1                             ------- 1206
m=application 32417 udp wb
a=delete:text2                          ------- 1207
m=application 32420 udp wb
a=id:layout1                            ------- 1208
m=application 32419 udp wb
a=delete:layout2                        ------- 1209
```

FIG.20

TRANSMITTER APPARATUS AND TRANSMITTING METHOD

TECHNICAL FIELD

The present invention relates to a transmission apparatus and transmission method which transmits contents including a media such as video, audio, text or still image and screen configuration information for displaying the contents.

BACKGROUND ART

As a method for integrating contents including text, still image, video and audio, and describing their spatial and temporal arrangements, a technology called "SMIL (Synchronized Multimedia Integration Language)" which is being standardized by the W3C (World Wide Web Consortium) is currently available.

SMIL is a description language similar to a hyper text description language HTML which is currently widely spread over the Internet and is a description language suitable for distribution of multi-media data including video.

A description example of an SMIL file will be explained using FIG. 1.

Information from <layout> on the third line to </layout> on the eighth line of the description shown in FIG. 1 corresponds to information on a spatial layout of contents.

Information from <par> on the 11th line to </par> on the 16th line corresponds to time information on reproduction of the contents.

Regions v, t and i in which video, text and still image are arranged are defined from the fifth to seventh lines.

The 12th to 14th lines define time information on reproduction of the video, audio, text and still image respectively. "src=" included in the 12th to 14th lines specifies a URL for acquiring the media and in this example, it specifies that video and audio are acquired using a RTSP (RealTime Streaming Protocol, Internet Draft RFC2326) protocol, while text and still image are acquired using an HTTP protocol.

Furthermore, "region=" included in the 12th or 14th, 15th line specifies the position at which the media is displayed and corresponds to the regions specified on the fifth to seventh lines.

For example, since the text data specified on the 14th line has region id="t", the text data is displayed in the region specified on the sixth line.

The line number is given for convenience of explanation and is not described in an actual SMIL file.

Next, the method whereby a client reproduces contents described in SMIL saved on a server over a network will be explained using FIG. 2.

A client 1604, a terminal which receives contents uses a protocol such as HTTP to acquire an SMIL file describing contents from a server 1 (1601) over a network such as the Internet. After acquiring the SMIL file, the client 1604 interprets the SMIL file and acquires various media described therein, that is, text, still image, video, audio, etc., from the server. More specifically, the client 1604 acquires video data and audio data from the server 2 (1602) and acquires text data and still image data from the server 3 (1603).

Then, based on space information and time information described in the acquired SMIL file, the client 1604 reproduces the respective described media at appropriate positions and appropriate times.

However, when contents are described using SMIL, the client 1604 cannot know the type of the multi-media data described in the SMIL file beforehand.

Furthermore, depending on the capability of reproducing the multi-media data of the client 1604, there is a possibility that all types of the multi-media data described in the SMIL file may not be decoded.

In order to solve this problem, a method whereby the client 1604 acquires a decoder corresponding to the capability of reproducing the multi-media data is proposed (e.g., the method described in the Unexamined Japanese Patent Publication No. 2002-297538 (pp 10, 11, FIG. 3)).

According to this method, even when the reception terminal does not have the capability of reproducing the multi-media data specified by scenario data of SMIL, etc., the reception terminal is allowed to acquire the decoder as appropriate. This allows the reception terminal to decode all estimated types of multi-media data.

However, the above described media distribution method involves the following problems.

The above described media distribution method does not take any transmission state of the multi-media data into consideration at all. That is, no consideration is given to a case where the reception terminal cannot receive the multi-media data.

Especially, when media are distributed through a radio transmission path, even if the reception terminal can decode the specified type of multi-media data, it may or may not be possible to transmit the multi-media data specified by SMIL depending on the band and error rate of the varying communication path.

For example, in a third-generation cellular phone system, a reception terminal located far from a base station may be able to receive media data at a low bit rate, while a reception terminal located close to a base station may be able to receive media data at a high bit rate.

Therefore, in a radio environment, the transmission band of a reception terminal varies according to the position of the reception terminal and the type of contents that can be received also thereby varies.

For this reason, there is a problem that in a reception environment in which there is large deterioration of video due to a narrow transmission band, if the reception terminal uses screen configuration information which displays video, it has to display deteriorated video.

Furthermore, even a conventional portable type reception terminal having a small screen such as a cellular phone terminal and PDA (Personal Data Assist) constructs a screen using the same screen configuration information as that of a reception terminal having a large screen such as a notebook personal computer.

For this reason, the portable type reception terminal has a problem that received data sticks out of the small screen and all the received data cannot be displayed.

On the contrary, when the reception terminal having a large screen uses the same screen configuration information as that of the portable type reception terminal, the reception terminal displays images only in a narrow range of the large screen and cannot display the images by effectively using the large screen.

DISCLOSURE OF THE INVENTION

It is an object of the present invention to allow reception terminals having different propagation environments such as transmission bands and packet loss rates as well as reception terminals having different display capabilities such as screen sizes to display multi-media contents in a screen configuration according to their propagation environments and display capabilities.

The present invention is constructed in such a way as to transmit a plurality of pieces of screen configuration information describing a spatial arrangement of contents from a transmission terminal and select, when a reception terminal receives the plurality of pieces of screen configuration information, screen configuration information according to conditions such as a transmission band and screen size of the reception terminal and display the contents using the selected screen configuration information.

This allows the reception terminal to select screen configuration information according to the propagation environment and display capability and display the contents using the selected screen configuration information.

BRIEF DESCRIPTION OF DRAWINGS

FIG. 1 illustrates a description of an SMIL file;

FIG. 3A illustrates a cable network targeted by Embodiment 1 of the present invention;

FIG. 3B illustrates a network in which cable/wireless networks targeted by Embodiment 1 are mixed;

FIG. 3C illustrates a wireless network targeted by Embodiment 1;

FIG. 6 illustrates a reference example of program configuration information;

FIG. 7 illustrates screen configuration information according to Embodiment 1;

FIG. 10A is a first diagram illustrating screen configuration information according to Embodiment 1;

FIG. 10B is a second diagram illustrating screen configuration information according to Embodiment 1;

FIG. 11 illustrates program information according to Embodiment 1;

FIG. 18 illustrates program configuration information according to Embodiment 2;

FIG. 19 illustrates another example of the configuration information according to Embodiment 2;

FIG. 20 illustrates the program configuration information indicated by difference information according to Embodiment 2;

Figure 2:
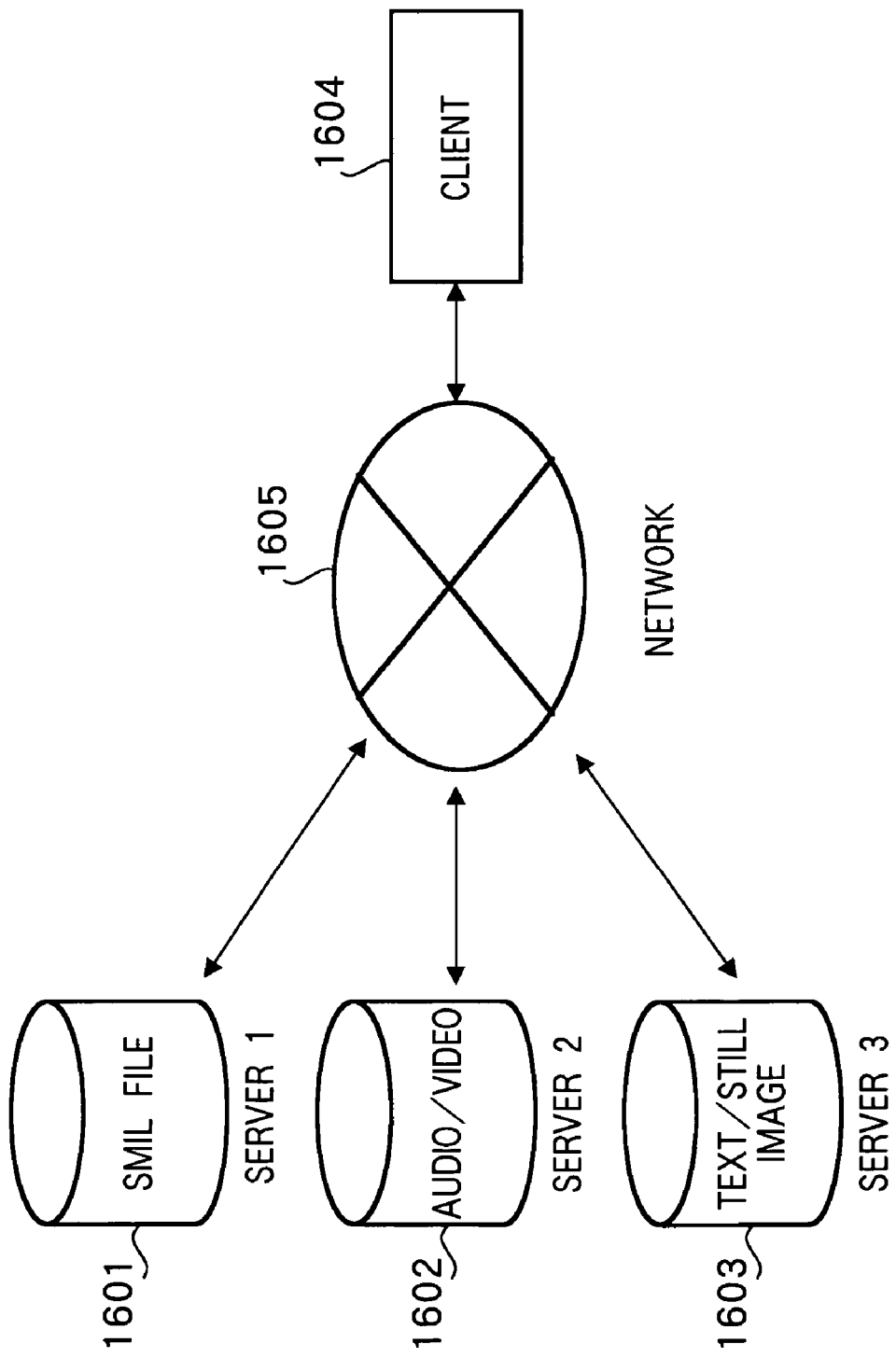
FIG. 2 illustrates a program transmission method according to a conventional example.

BEST MODE FOR CARRYING OUT THE INVENTION (Embodiment 1)

With reference now to the attached drawings, Embodiment 1 of the present invention will be explained in detail below. First, the mode of use of a communication network according to Embodiment 1 will be explained using FIG. 3A. FIG. 3A shows an overview of a data transmission/reception system according to Embodiment 1.

The present data transmission/reception system adopts a configuration in which servers 302 and reception terminals 304 are connected together through a communication network 301.

The reception terminals 304 are reception terminals having different display resolutions or processing capacities such as cellular phone, TV, PDA and personal computer. There are a plurality of reception terminals 304.

There are also a plurality of servers 302 that distribute data and each reception terminal 304 receives contents from a plurality of servers 302 simultaneously. Furthermore, the reception terminal 304 can also have a function of connecting a plurality of transmissions.

Communication devices such as the server 302 and reception terminal 304 are mutually connected by a relay node 303 such as a router and GW (gateway). The router and GW have a broadcast or multicast function and the router and GW can replicate data packets.

The communication network 301 may be a cable network (e.g., ADSL, ISDN, ATM, FTTH) or wireless network (e.g., cellular phone, wireless LAN).

The present data transmission/reception system uses the Internet protocol as a transmission protocol.

Furthermore, the contents transmission method may include a one-to-one communication between the server 302 and reception terminal 304 or one-to-N communications using a broadcast or multicast function. In this embodiment, the multicast function is used from the server 302 to the relay node 303 and the broadcast function is used from the relay node 303 to the reception terminal.

In this way, the reception terminal 304 can receive latest contents by opening a predetermined channel.

On the other hand, the server 302 which is a transmission terminal targets various media such as video, audio, music, text, still image, screen configuration information as contents to be transmitted. Furthermore, the server 302 transmits the program.

One program consists of contents made up of various media including video, audio (including music), text, still image, animation or computer graphics, screen configuration information which controls display positions of the contents and program configuration information which describes a combination between the screen configuration information and contents to be displayed.

When the reception terminal 304 knows the location of the screen configuration information and the screen configuration information describes a method of acquiring addresses of the contents to be displayed, the reception terminal 304 can also acquire other contents if it acquires the screen configuration information. Therefore, the program configuration information is not indispensable in this case.

Furthermore, when contents are transmitted unidirectionally using a multicast or broadcast function, the method of acquiring screen configuration information becomes unknown, and therefore the screen configuration information and contents are identified using the program configuration information which is transmitted by a specific transmission method.

As a description method for screen configuration information, for example, SMIL (Synchronized Multimedia Integration Language) or JAVA(R) can be used.

Furthermore, as a description method for program configuration information, for example, SDP (Session Description Protocol) can be used.

Details of SMIL are described in http://www.w3.org/TR/smil20/, while details of SDP are described in http://www.ietf.org/rfc/rfc2327.txt.

Here, as shown in FIG. 3B, the communication network may also be a communication network 305 in which cable networks and wireless networks are mutually connected. Furthermore, the communication network may also be a broadcasting network (e.g., digital terrestrial broadcasting, digital satellite broadcasting) or a system configuration which merges a broadcasting network and communication network.

As shown in FIG. 3B, when contents are broadcast to mobile reception terminals 307 such as cellular phones, there is also a demand for broadcasting contents which may differ from one region to another.

In such a case, when the server 302 broadcasts or multicasts contents to a plurality of reception terminals 304, it is not easy to change broadcasting contents according to their positions.

Therefore, in order to realize broadcasting according to positions, in the example in FIG. 3B, a one-to-one unicast communication is realized between the server 302 and relay node 306 (cable network section) and contents are distributed between the relay node 306 and reception terminal 307 using a broadcast function over a wireless network.

The relay node 306 which realizes the broadcast function does not broadcast packets across other different relay nodes 306.

Furthermore, as shown in FIG. 3C, Embodiment 1 may have a communication mode in which servers 302 are located at various positions, data are broadcast to neighboring regions and reception terminals 307 receive the data.

In such a communication mode, BlueTooth or wireless LAN, etc., may be used as a transmission protocol.

Figure 4:
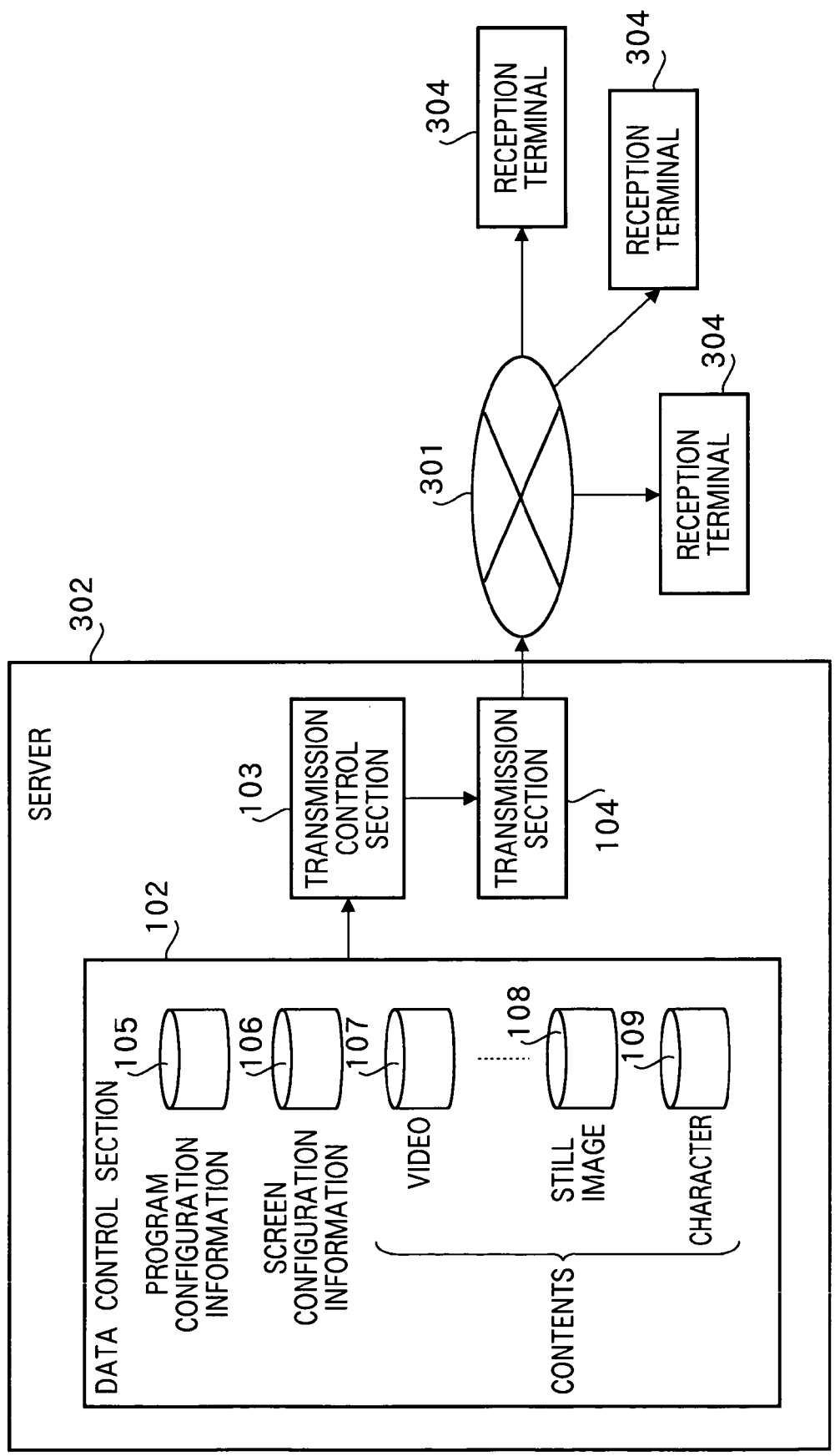
FIG. 4 is a first diagram illustrating a data transmission/reception system according to Embodiment 1.
Figure 5:
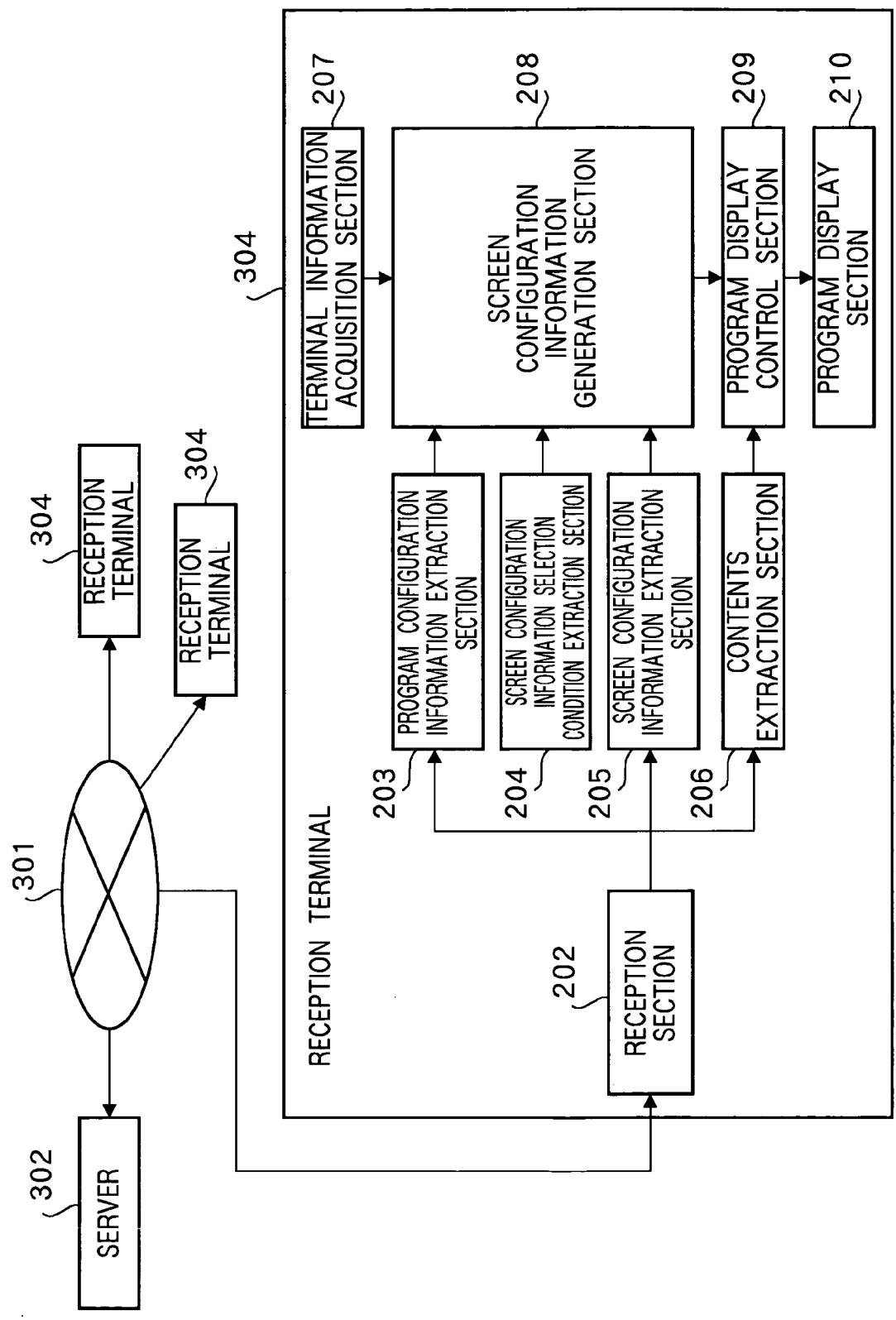
FIG. 5 is a second diagram illustrating the data transmission/reception system according to Embodiment 1.

Next, the configuration of the transmission/reception system according to Embodiment 1 will be explained in detail using FIG. 4 and FIG. 5. FIG. 4 and FIG. 5 illustrate the data transmission/reception system according to Embodiment 1.

The server 302 is provided with a data control section 102 that stores and controls various data.

The data control section 102 is provided with a program configuration information storage section 105 that stores program configuration information which makes up a program, a screen configuration information storage section 106 that stores screen configuration information, and a video storage section 107 that stores video, a still image storage section 108 that stores a still image and a character storage section 109 that stores character data as contents storage sections. The data control section 102 selects the information stored as appropriate and sends the information to a transmission control section 103.

The transmission control section 103 determines transmission sequence and timings of the program configuration information, screen configuration information and contents which make up the program and sends them to the transmission section 104. Furthermore, the transmission control section 103 generates difference information which will be described later and sends it to the transmission section 104.

The transmission section 104 transmits the information sent from the transmission control section 103 to the reception terminal 304 over the communication network 301.

As the transmission protocol used by the server 302, it is possible to use a protocol (e.g., TCP) which confirms receipt or a protocol (e.g., UDP) which does not confirm reception. In addition, the server 302 may also use a media transmission protocol represented by RTP (Realtime Transport Protocol).

On the other hand, the reception terminal 304 is provided with a reception section 202 that receives transmission from the server 302.

Furthermore, the reception terminal 304 is provided with a program configuration information extraction section 203 that extracts program configuration information from the data received by the reception section 202. The program configuration information extraction section 203 outputs the extracted program configuration information to a screen configuration information selection condition extraction section 204 and a screen configuration information generation section 208.

Furthermore, the reception terminal 304 is provided with a screen configuration information extraction section 205 that extracts screen configuration information from the data received by the reception section 202. The screen configuration information extraction section 205 outputs the extracted screen configuration information to the screen configuration information generation section 208.

Furthermore, the reception terminal 304 includes a contents extraction section 206 that extracts contents such as video, audio, document, still image from the data received by the reception section 202. The contents extraction section 206 outputs the extracted contents to the program display control section 209.

When the program configuration information includes a screen configuration information selection condition, the screen configuration information selection condition extraction section 204 extracts the screen configuration information selection condition from the program configuration information and outputs it to the screen configuration information generation section 208.

A terminal information acquisition section 207 acquires characteristic information of the reception terminal 304 and outputs it to the screen configuration information generation section 208.

Examples of the characteristic information of the terminal include an authenticated transmission band of a communication channel to which the terminal is connected, effective transmission band obtained by observing a communication channel, screen size of the terminal, number of displayable colors, CPU's throughput, presence/absence and capacity of a storage medium such as a semiconductor memory and magnetic disk, presence/absence of a decoder of each media such as video, audio, still image, etc.

The screen configuration information generation section 208 selects screen configuration information which matches the condition from the program configuration information, screen configuration information, screen configuration information extraction condition and characteristic information of the reception terminal 304 such as the transmission band obtained from the terminal information acquisition section 207. Furthermore, the screen configuration information generation section 208 generates new screen configuration information when the information transmitted is difference information which will be described later. Then, the screen configuration information generation section 208 outputs the screen configuration information to the program display control section 209.

The program display control section 209 constitutes a program using the contents extracted by the contents extraction section 206 based on the screen configuration information transmitted and outputs the program to the program display section 210.

Next, a reference example of the program configuration information will be explained using FIG. 6. FIG. 6 illustrates a reference example of the program configuration information.

Suppose the program configuration information describes a set of contents of various media such as video, audio, document, still image reproduced as program contents and screen configuration information which is layout information when those contents are displayed on a screen. FIG. 6 shows an example of program configuration information described in SDP.

The program configuration information 400 shown in FIG. 6 describes information on the entire program such as information on a title and administrator on line 401 and above.

Furthermore, the program configuration information 400 describes information on each media on a line which starts with m= to the next line which starts with m=.

The line (line 402) which starts with m= is information on the audio contents and an ID "audio1" is assigned as the information identifying the audio contents (line 403).

Likewise, the program configuration information 400 describes information on the video contents (line 404, ID is "video1"), information on the document contents (line 405, ID is "text1"), information on the still image contents (line 406, ID is "image1").

Furthermore, the program configuration information 400 describes information on the screen configuration information (line 407, ID is "layout1").

From the program configuration information 400 in FIG. 6, it is evident that this program constitutes a screen using contents video1, audio1, text1, image1 according to the screen configuration information of layout1.

Next, the screen configuration information transmitted by the server 302 will be explained using FIG. 7. FIG. 7 illustrates screen configuration information transmitted by the server 302.

Suppose the screen configuration information displays positions on the screen at which contents of various media such as video, document, still image reproduced as program contents are displayed. FIG. 7 shows an example where screen configuration information is described in SMIL.

The screen configuration information 500 shown in FIG. 7 describes on line 501 that the size of the entire screen is 320 dots in width and 480 dots in height.

Furthermore, the screen configuration information 500 describes on line 502 that a region named "video" has a size of 300 dots in width and 300 dots in height at a position 100 dots down and 10 dots left from the top left corner of the entire screen.

Furthermore, lines 503 and 504 of the screen configuration information 500 also describe the positions and sizes of regions named "text" and "image."

Furthermore, line 505 of the screen configuration information 500 describes that video contents having an ID "video1" are displayed in the region named "video" (defined on line 502).

Lines 507 and 508 of the screen configuration information 500 likewise describe that contents having IDs "text1" and "image1" are displayed in the region named "text" (defined on line 503) and the region named "image" (defined on line 504).

Since line 506 describes audio contents, there is no information indicating the region in which the contents are displayed.

The contents name "video1" is associated with ID "video1" defined on line 404 in FIG. 6, the contents name "audio1" is associated with ID "audio1" defined on line 403 in FIG. 6, the contents name "text1" is associated with ID "text1" defined on line 405 in FIG. 6 and the contents name "image1" is associated with ID "image1" defined on line 406 in FIG. 6.

In this way, the contents video1, text1 and image1 received based on the program configuration information 400 in FIG. 6 are layouted based on the screen configuration information 500 in FIG. 7.

On the other hand, as shown in the program information 400 in FIG. 6, when there is only one piece of screen configuration information for constituting one program, the following two problems occur.

1. In the case of a transmission path having a large packet loss rate or transmission path having a small transmission band, there is a high probability that contents having a large amount of transmission such as video may not be transmitted correctly and may deteriorate.

The screen displayed on the program display section 210 of the reception terminal 304 in this case will be explained using FIG. 8.

Figure 8A:
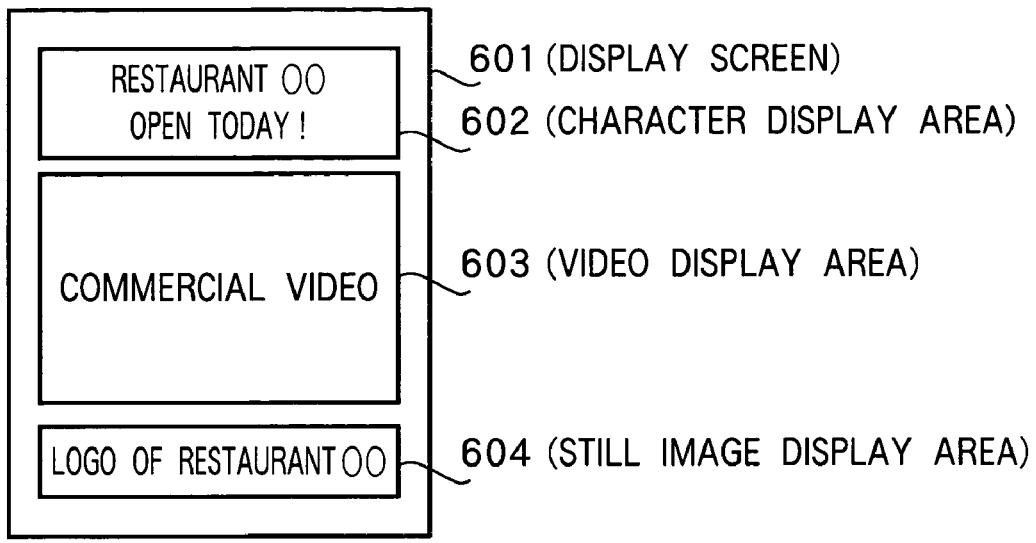
FIG. 8A is a first diagram illustrating a screen displayed on a program display section according to Embodiment 1.
Figure 8B:
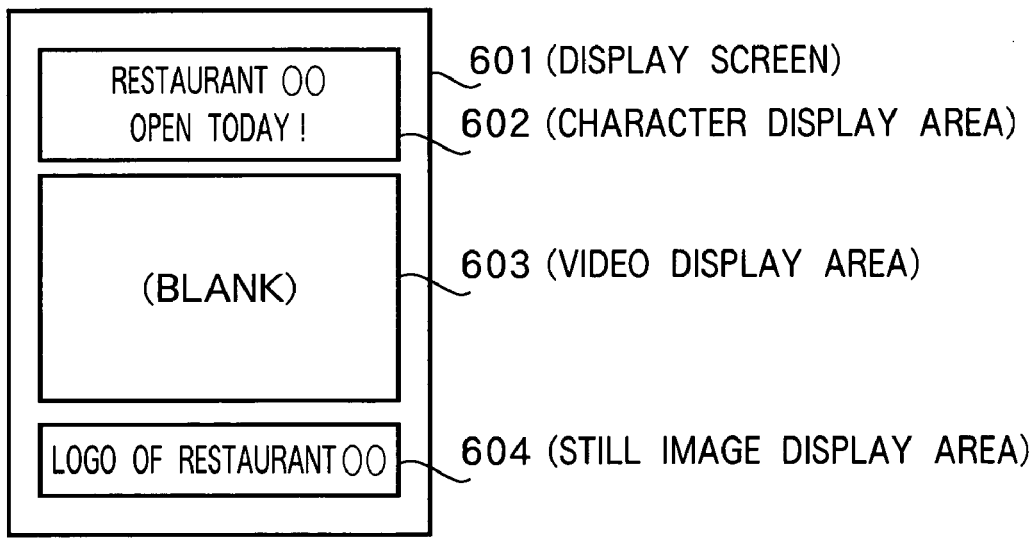
FIG. 8B is a second diagram illustrating a screen displayed on the program display section according to Embodiment 1.

Suppose a case where video is not received correctly in a program which displays a character display area (602), a video display area (603) and a still image display area (604) on a display screen 601 as shown in FIG. 8A. In this case, as shown in FIG. 8B, the video display area 603 is left blank and the amount of information displayed on the screen decreases.

2. When there is a terminal having a different screen size, the screen configuration may not match the size of the screen.

A screen displayed on the program display section 210 of the reception terminal 304 will be explained using FIG. 9 in this case.

Figure 9:
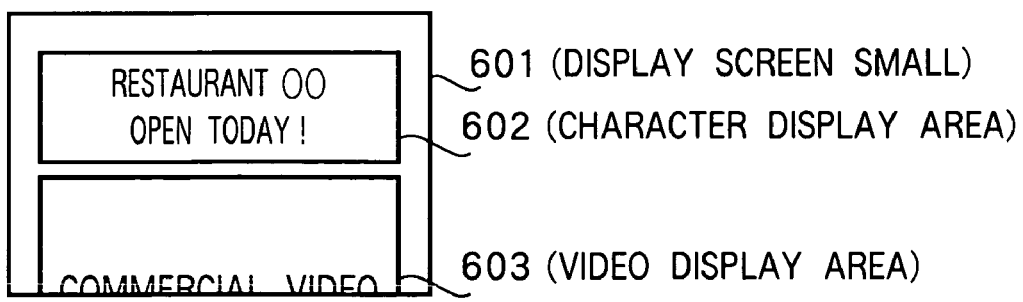
FIG. 9 is a third diagram illustrating a screen displayed on the program display section according to Embodiment 1.

When an attempt is made to display the screen configuration information shown in FIG. 8A on a terminal having a small screen size, part of the video display area (603) is lost and it is not possible to display the whole contents as shown in FIG. 9.

Therefore, according to Embodiment 1, as a first method of solving the problem when there is only one piece of screen configuration information, the transmission control section 103 of the server 302 transmits a plurality of pieces of screen configuration information. That is, the transmission control section 103 of the server 302 transmits screen configuration information other than the screen configuration information 500 shown in FIG. 7.

Next, the screen configuration information that the server 302 transmits together with the screen configuration information 500 shown in FIG. 7 will be explained using FIG. 10. FIG. 10 illustrates screen configuration information according to Embodiment 1.

The screen configuration information 800 shown in FIG. 10A is different only in line 805 from the screen configuration information 500 shown in FIG. 7.

Line 805 shows that document contents indicated by "text2", not video contents are displayed in the region "video."

That is, the reception terminal 304 selects the screen configuration information 800 instead of the screen configuration information 500, and can thereby change the display contents from video contents to document contents of small size. This reduces the influence of deterioration of contents due to a packet loss.

Furthermore, the server 302 also transmits the screen configuration information transmitted together with the screen configuration information 800 shown in FIG. 10 as difference information. Next, the difference information transmitted by the server 302 will be explained using FIG. 10B. FIG. 10 illustrates the difference information according to Embodiment 1.

The difference information which will be explained below is created by the transmission control section 103 of the server 302 detecting the difference with reference to a plurality of pieces of screen configuration information.

The difference information ("layout3") 810 shown in FIG. 10B shows the difference between the screen configuration information ("layout2") 800 in FIG. 10A and screen configuration information ("layout1") 500 in FIG. 7.

More specifically, "layout3" 810 shows on line 811 that "layout1" can be generated in FIG. 7 by replacing 12th line (line 805) of "layout2" 800 in FIG. 10A.

Furthermore, "layout3" 810 specifies on line 812 the portion to be replaced of "layout2" 800 and describes on line 813 the replacing content.

By sending "layout3" which is the difference information between "layout1" 500 and "layout2" 800, it is substantially possible to notify two pieces of screen information without sending "layout1" 500. Furthermore, transmitting "layout1" 500 with "layout3" 810 which is the difference information of "layout2" 800 can reduce an amount of information of the screen configuration information transmitted.

Embodiment 1 uses an output format of a diff command of UNIX(R) as an example of the method of expressing the difference information 810, but it is also possible to use an expression method of other difference information.

Furthermore, in this embodiment, because a plurality of pieces of screen information are sent, the program configuration information has a plurality of pieces of screen configuration information. Furthermore, the program configuration information also describes a screen configuration information selection condition to select one piece of screen configuration information from the plurality of pieces of screen configuration information.

Next, the program configuration information when the server 302 transmits two pieces of screen configuration information "layout2" and "layout3" will be explained using FIG. 11. FIG. 11 illustrates the program information according to Embodiment 1.

The program configuration information 900 shown in FIG. 11 describes on line 901, line 902, line 903, line 904 and line 907 that this program transmits "text1", "text2", "image1", "layout2" and "layout3."

Thus, the program configuration information 900 describes that the program has a plurality of pieces of screen configuration information of a plurality of layouts "layout2" and "layout3."

Furthermore, the program information 900 describes on line 905 that the screen configuration information indicated by "layout2" is used when the transmission band is 96000 bps or less. Line 905 of the program information 900 is a screen configuration information selection condition. It is a condition as to which of "layout2" or "layout3" should be selected.

Furthermore, line 906 of the program information 900 describes priority in determining which screen configuration information should be selected when the reception terminal 304 can select a plurality of pieces of screen configuration information based on the screen configuration information selection condition indicating a transmission band.

Line 906 of the program information 900 is also a screen configuration information selection condition. This is also a condition as to which of "layout2" or "layout3" should be selected.

Furthermore, line 908 of the program information 900 describes that the screen configuration information indicated by "layout3" is difference information from "layout2." That is, in this case, "layout3" represents "layout1." When difference information is not used as the screen configuration information, there is no description of line 908.

Furthermore, line 909 of the program information 900 describes that the screen configuration information indicated by "layout3" is used when the transmission band ranges from 64001 bps to 384000 bps.

Furthermore, line 910 of the program information 900 describes priority of "layout3."

Line 909 and line 910 of the program information 900 are also screen configuration information selection conditions.

When the reception terminal 304 can receive two pieces of screen configuration information "layout2" and "layout3" without any loss and can select both "layout2" and "layout1" reconstructed from "layout3" which is the difference information under the screen configuration information selection condition, the reception terminal 304 selects either one according to priority, for example, "layout3" (or "layout1" reconstructed from "layout3") which has priority of a higher number.

Figure 12:
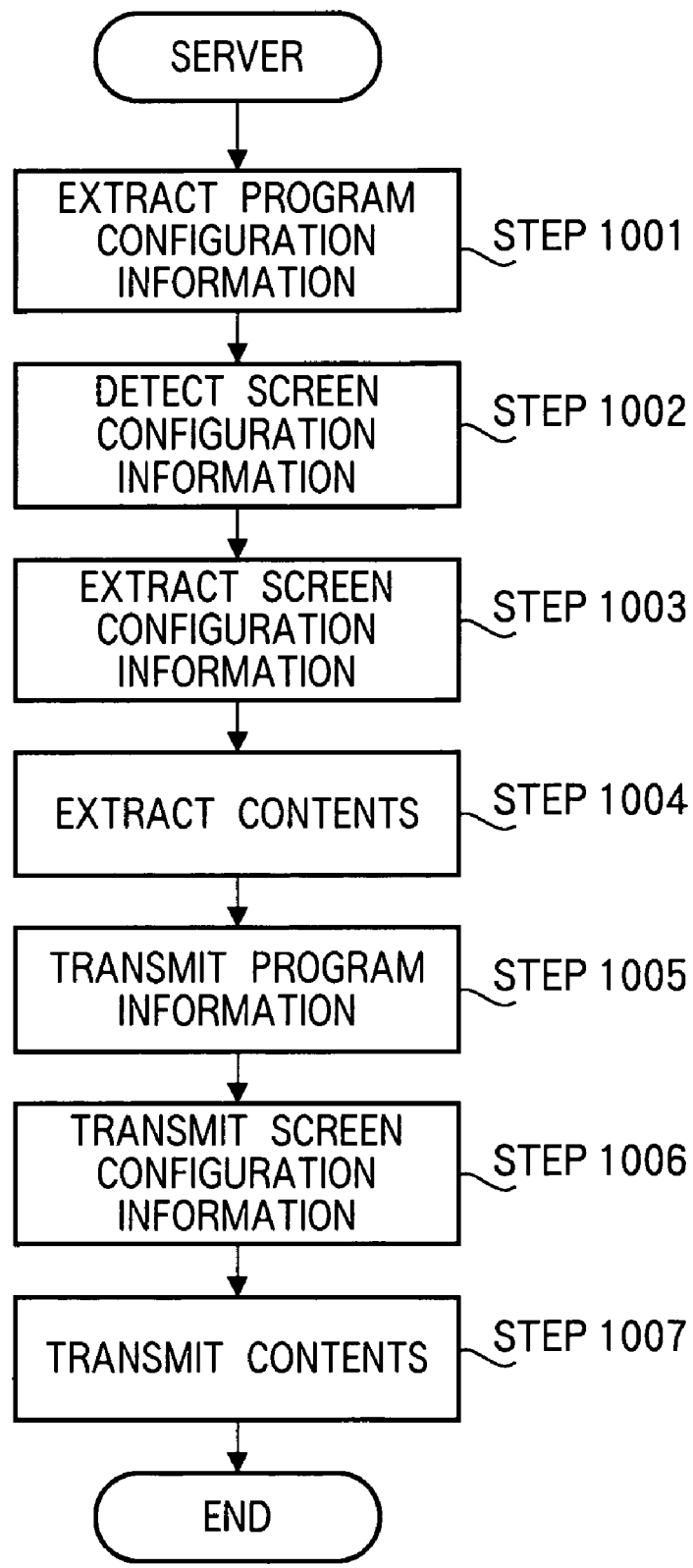
FIG. 12 is an operation flow chart of a server according to Embodiment 1.

Next, the operation of the server 302 transmitting the program configuration information, screen configuration information and contents will be explained using FIG. 12. FIG. 12 is an operation flow chart of the server according to Embodiment 1.

First, the transmission control section 103 of the server 302 extracts program configuration information from the program configuration information storage section 105 of the data control section 102 (step 1001).

Next, the transmission control section 103 references the extracted program configuration information and detects the plurality of pieces of screen configuration information described in the program configuration information (step 1002). Then, the detected screen configuration information is extracted from the screen configuration information storage section 106 (step 1003).

When the screen configuration information extracted in step 1002 is difference information, the transmission control section 103 extracts the difference information.

Next, the transmission control section 103 extracts contents such as video, still image, character described in the program information extracted in step 1001 from the video storage section 107, still image storage section 108 and character storage section 109 (step 1004).

Next, the transmission control section 103 transmits the program configuration information extracted in step 1001 to the reception terminal 304 through the transmission section 104 (step 1005). Next, the transmission control section 103 transmits the screen configuration information described in the program configuration information extracted in step 1003 to the reception terminal 304 through the transmission section 104 (step 1006). Then, the transmission control section 103 transmits the contents extracted in step 1004 to the reception terminal 304 through the transmission section 104 (step 1007).

In this way, the server 302 transmits the program configuration information, a plurality of pieces of image configuration information and contents to the reception terminal 304.

Figure 13:
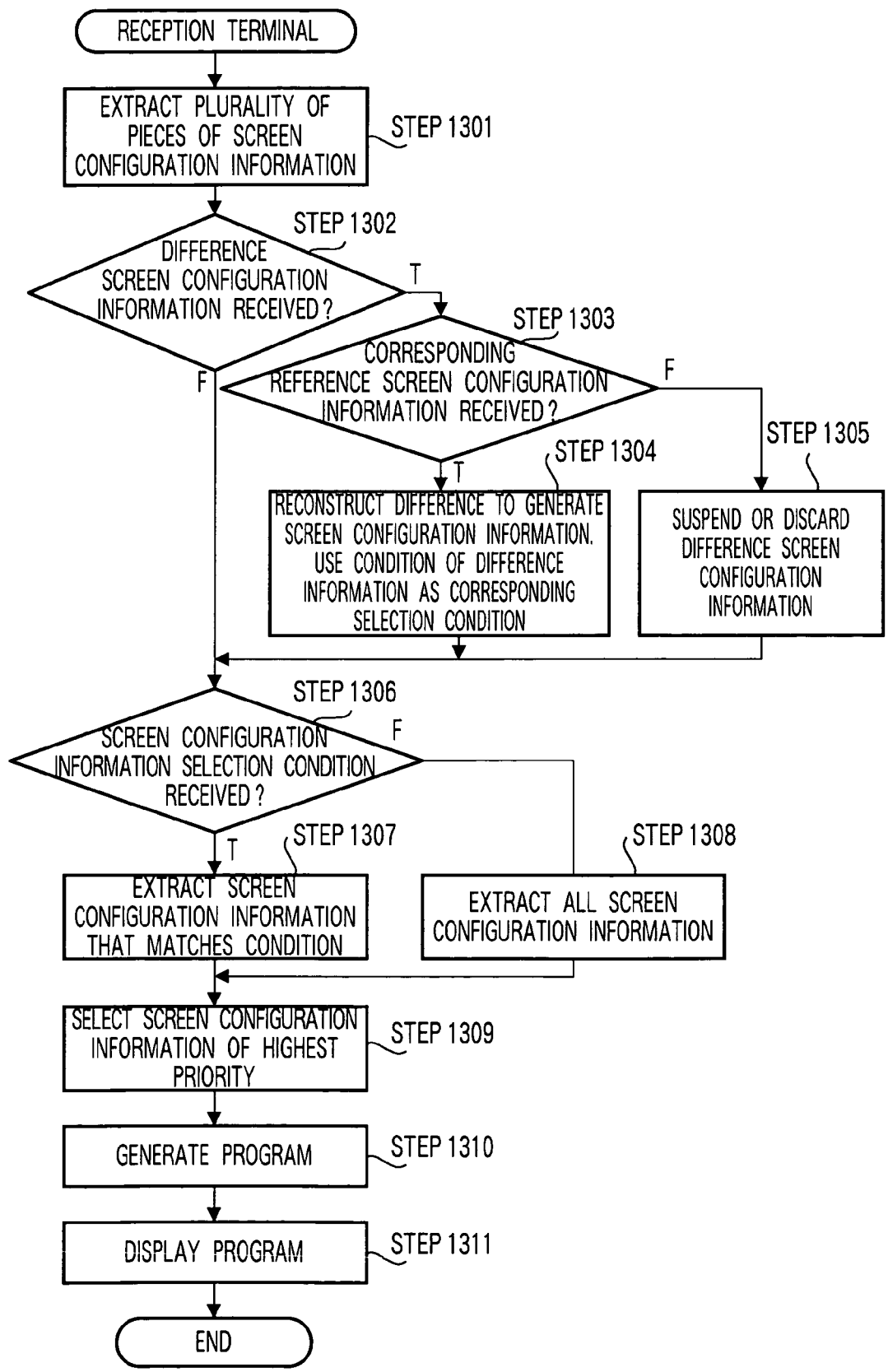
FIG. 13 is a flow chart of the operation of the reception terminal according to Embodiment 1.

Next, the operation of the reception terminal 304 will be explained using FIG. 13. FIG. 13 is a flow chart of the operation of the reception terminal 304 according to Embodiment 1.

First, the reception terminal 304 receives various types of data at the reception section 202. Next, the screen configuration information extraction section 205 extracts a plurality of pieces of screen configuration information from the various types of data received and sends the screen configuration information to the screen configuration information generation section 208 (step 1301).

Next, when difference screen configuration information is found in the received screen configuration information (step 1302), the screen configuration information generation section 208 checks whether the reference screen configuration information corresponding to the difference screen configuration information has been received or not (step 1303).

When FIG. 11 is taken as an example, when "layout3" has been received, it is known from line 908 that "layout3" is difference information relative to "layout2", and therefore the screen configuration information generation section 208 checks whether "layout2" has been received or not. Then, when reference screen configuration information ("layout2") has been received, the screen configuration information generation section 208 reconstructs the difference and generates screen configuration information ("layout1" is generated in the example of FIG. 11).

Next, the screen configuration information generation section 208 uses the condition (line 909) described in the difference information as the screen configuration information selection condition for the screen configuration information generated (step 1304). The screen configuration information selection condition is extracted from the screen configuration information selection condition extraction section 204.

On the other hand, when the reference screen configuration information corresponding to the difference screen configuration information has not been received in step 1303, the screen configuration information generation section 208 suspends or discards the difference screen configuration information until the reference screen configuration information ("layout2") can be received (step 1305).

Next, the screen configuration information generation section 208 checks whether the screen configuration information selection condition has been received or not (step 1306).

This embodiment assumes that the screen configuration information selection condition is included in the program configuration information, but the screen configuration information selection condition need not be described in the program configuration information. In this case, the screen configuration information selection condition may be transmitted using a different transmission method or need not be sent at all. When the screen configuration information selection condition is not sent, a screen can be configured using the screen configuration information which the reception terminal has received without any loss.

When the screen configuration information selection condition has been received, the screen configuration information generation section 208 extracts the screen configuration information which matches the condition (step 1307).

The program configuration information selection condition is a condition under which screen configuration information appropriate for the transmission state of the reception terminal 304 is selected, and therefore the reception terminal 304 can select the screen configuration information appropriate for the own terminal.

On the other hand, when the screen configuration information selection condition has not been received, the screen configuration information generation section 208 extracts all the screen configuration information received (step 1308).

Then, when there is a plurality of pieces of extracted screen configuration information, the screen configuration information generation section 208 selects screen configuration information with the highest priority added to the screen configuration information (step 1309).

Priority is higher for screen configuration information which should be displayed more preferably. Therefore, since the priority information is described in the screen configuration information, even when there is a plurality of pieces of screen configuration information that match the screen configuration information selection condition according to the transmission condition, the reception terminal 304 can select screen configuration information that should be displayed preferably.

Next, the screen configuration information generation section 208 sends the selected screen configuration information to the program display control section 209.

The program display control section 209 selects contents described in the screen configuration information transmitted from the contents extracted by the contents extraction section 206. Next, the program display control section 209 generates a program using the screen configuration information transmitted and the selected contents and outputs the program to the program display section 210 (step 1310).

Then, the program display section 210 displays the program transmitted (step 1311).

Thus, the reception terminal 304 can select screen configuration information appropriate for the own terminal from the plurality of pieces of screen configuration information received, and generate and display a program using the screen configuration information appropriate for the own terminal.

Figure 14:
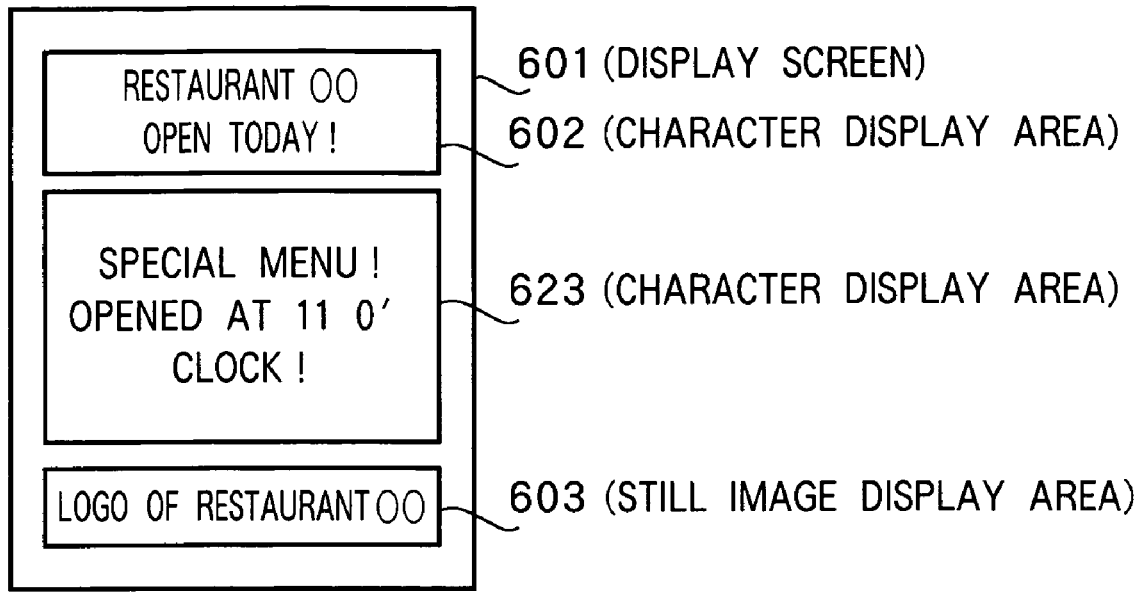
FIG. 14 is a fourth diagram illustrating a screen displayed on the program display section according to Embodiment 1.

For example, when the reception terminal 304 receives layout2 and layout3 in FIG. 10 and program configuration information in FIG. 11, the reception terminal 304 can replace the portion of the video display area 603 shown in FIG. 8 with the character display area 623 and display characters as shown in FIG. 14.

Compared to video contents, character contents of small size also have a low probability of being lost during reception, and therefore the reception terminal 304 can accurately receive and display the character contents even when the transmission state is bad. Therefore, when the transmission state is bad, the reception terminal 304 displays the character contents as shown in FIG. 14 and can thereby display a greater amount of information than when displaying video with some loss (FIG. 8B).

As explained above, according to Embodiment 1, the reception terminal 304 can select screen configuration information according to a propagation environment and display the contents using the selected screen configuration information. The screen configuration information selected according to the propagation environment is the information using contents that can be received by the reception terminal 304, and therefore the reception terminal 304 can display a screen using the screen configuration information using the contents that can be received.

Furthermore, Embodiment 1 is likewise applicable even when the display screen size of the reception terminal 304 is different. By describing "a=terminal:pc", "a=terminal:pda" instead of "a=bandwidth: . . . " (e.g., line 905 in FIG. 11) of the screen configuration information selection condition, it is possible to specify screen configuration information for a personal computer and screen configuration information for a PDA. Furthermore, instead of a description indicating the type of a terminal such as "pc" and "pda", the screen size can be directly described, for example, "a=terminal:640×480."

Figure 15:
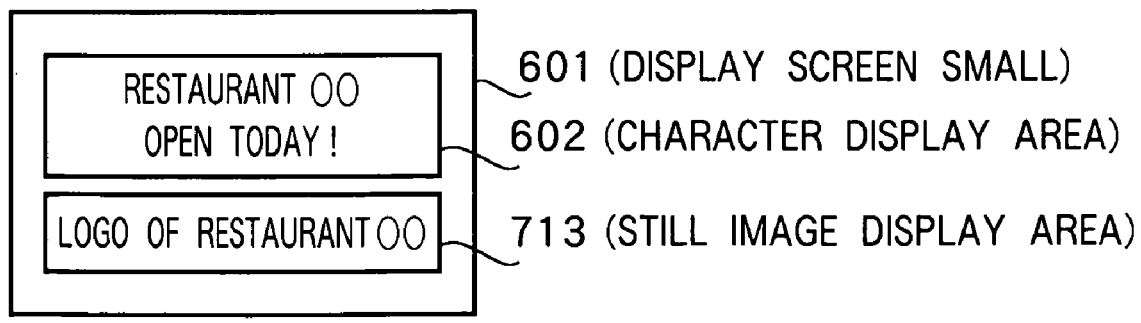
FIG. 15 is a fifth diagram illustrating a screen displayed on the program display section according to Embodiment 1.

The reception terminal 304 interprets these descriptions and specifies screen configuration information, and therefore even when the reception terminal 304 has a small display screen 601 as shown in FIG. 15, the reception terminal 304 can select the screen configuration information most appropriate for the size and display the program. For example, as shown in FIG. 15, the display screen 601 can display only a character 602 and still image 713 without any loss.

The embodiment has explained a mode in which a screen configuration information selection condition is described in program configuration information, but it is also possible to use a mode in which the screen configuration information selection condition is described in the screen configuration information.

In this case, for example, the screen configuration information shown in FIG. 10A or FIG. 10B can describe a screen configuration information selection condition <condition bandwidth="-96000"/>. More specifically, in the case of the screen configuration information shown in FIG. 10A, the screen configuration information selection condition is described between </layout> and </head>.

Embodiment 1 has described contents that can be displayed on a screen, and similar output and selection are possible for audio contents, too.

For example, SMIL which is the screen configuration information used in Embodiment 1 can also describe audio contents, and therefore it is possible to change from screen configuration information describing large volume audio contents to screen configuration information describing small volume audio contents. This can also prevent audio contents to be reproduced from being lost due to a transmission state.

Here, it is also possible to adopt a mode in which processes carried out by the server 302 and reception terminal 304 are implemented by a program and stored in a storage medium, and a general-purpose computer reads and executes the program.

(Embodiment 2)

Embodiment 2 of the present invention causes a server to transmit a plurality of pieces of program configuration information as a second method for solving the problem when there is only one piece of screen configuration information.

Figure 16:
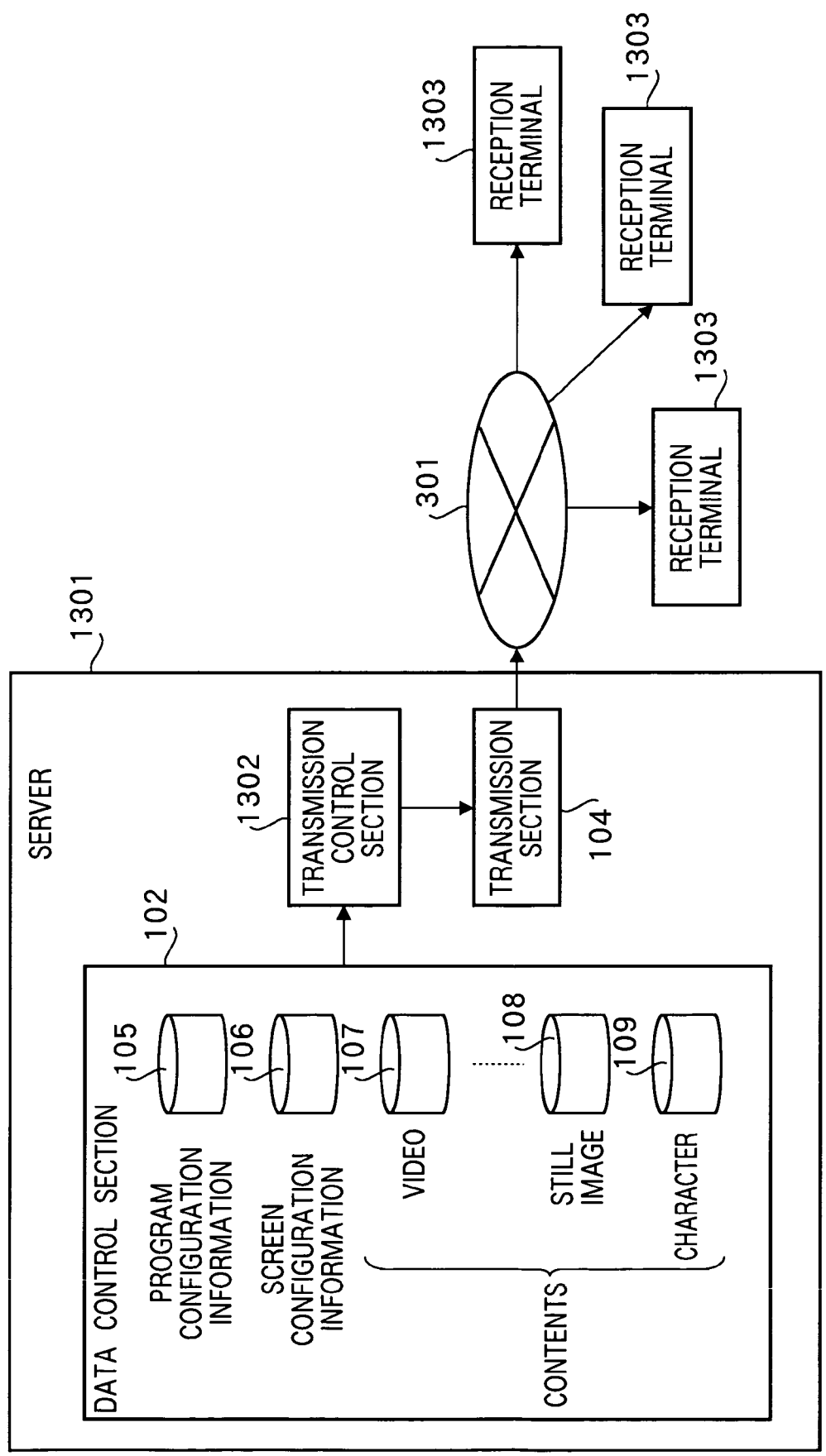
FIG. 16 is a first diagram showing the configuration of a data transmission/reception system according to Embodiment 2 of the present invention.
Figure 17:
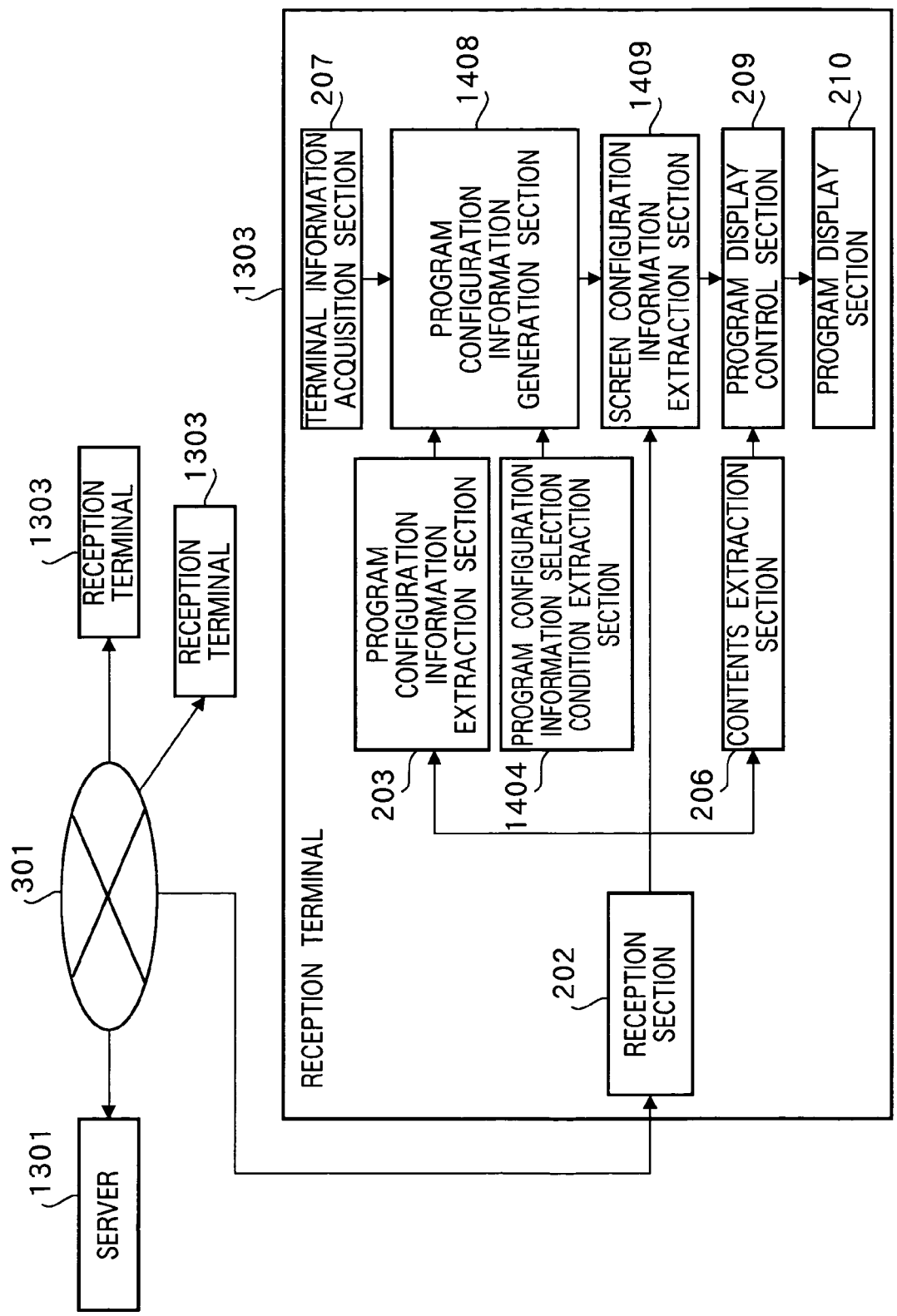
FIG. 17 is a second diagram showing the configuration of the data transmission/reception system according to Embodiment 2 of the present invention.

First, the configuration of a transmission/reception system according to Embodiment 2 will be explained in detail using FIG. 16 and FIG. 17. FIG. 16 and FIG. 17 illustrate the configuration of the data transmission/reception system according to Embodiment 2. The same parts as those already explained are assigned the same reference numerals and detailed explanations thereof will be omitted.

First, a server 1301 according to Embodiment 2 will be explained.

A transmission control section 1302 of the server 1301 extracts a plurality of pieces of program configuration information 105 and transmits them to a reception terminal 1303 according to Embodiment 2 through a transmission section 104.

Furthermore, when transmitting a plurality of pieces of program configuration information, the transmission control section 1302 also uses difference program information which is difference information among them. Furthermore, the transmission control section 1302 detects the difference from the plurality of pieces of program information and generates difference program information.

Next, the configuration of the reception terminal 1303 will be explained.

The reception terminal 1303 is provided with a program configuration information selection condition extraction section 1404 that extracts a program configuration information selection condition when the program configuration information selection condition is included in the program configuration information output from a program configuration information extraction section 203. The program configuration information selection condition extraction section 1404 outputs the extracted program configuration information selection condition to a program configuration information generation section 1408.

The program configuration information generation section 1408 selects program configuration information that matches the program configuration information extraction condition from information on a transmission band, etc., obtained from a terminal information acquisition section 207. When the program configuration information is described with difference information from other program configuration information, the program configuration information generation section 1408 also generates new program configuration information. The program configuration information generation section 1408 transmits the program configuration information obtained to a screen configuration information extraction section 1409.

The screen configuration information extraction section 1409 extracts the screen configuration information described in the received program configuration information and sends it to a program display control section 209.

Next, the program configuration information transmitted by the server 1301 will be explained using FIG. 18. FIG. 18 illustrates the program configuration information according to Embodiment 2.

Line 1001 of the program configuration information 1600 of Embodiment 2 describes a name "program1."

Furthermore, line 1002 of the program configuration information 1600 describes that this program configuration information is used when the transmission band ranges from 64001 bps to 384000 bps. The description on this line 1002 is a program configuration information selection condition.

Thus, Embodiment 2 causes the server 1301 to transmit a plurality of pieces of program configuration information, and therefore the program configuration information is assigned a program configuration information selection condition so that the reception terminal 1303 can select appropriate program configuration information.

Furthermore, line 1003 of the program configuration information 1600 describes priority for deciding which program configuration information should be selected when the reception terminal 1303 can select a plurality of pieces of program configuration information under the program configuration information selection condition (line 1002) indicating the transmission band.

Furthermore, line 1003 of the program configuration information 1600 is also called a "program configuration information selection condition."

Furthermore, lines 1004 to 1008 of the program information 1600 describe that this program consists of "audio1", "video1", "text1", "image1" and screen configuration information "layout1."

Another example of the program configuration information according to Embodiment 2 will be explained using FIG. 19. FIG. 19 illustrates another example of the program configuration information according to Embodiment 2.

Line 1101 of a program configuration information 1700 shown in FIG. 19 has a name "program2."

Furthermore, line 1102 of the program configuration information 1700 describes that this program information is used when the transmission band is equal to or lower than 96000 bps as the program configuration information selection condition.

Furthermore, line 1103 of the program configuration information 1700 describes that priority is 3. This embodiment assumes that a greater value in priority indicates higher priority.

Furthermore, lines 1104 to line 1107 of the program configuration information 1700 describe that this program consists of "text1", "text2", "image1" and screen configuration information "layout2."

The server 1301 transmits the program configuration information "program1"1600 and "program2" 1700 to which a program information selection condition is assigned.

Furthermore, the server 1301 may transmit difference information as program configuration information.

The program configuration information (difference program configuration information) indicated by difference information will be explained using FIG. 20. FIG. 20 illustrates the program configuration information which is difference information according to Embodiment 2.

The difference program configuration information uses an output format of a diff command of UNIX(R) in the same way as the difference screen configuration information of Embodiment 1.

Line 1201 of difference program configuration information 1800 shown in FIG. 20 describes a name "program3."

Furthermore, line 1202 of the difference program configuration information 1800 describes that this program configuration information is difference information from the program configuration information indicated by "program2."

Furthermore, line 1203 of the difference program configuration information 1800 describes that this program configuration information is used when the transmission band ranges from 64001 bps to 384000 bps (program configuration information selection condition).

Furthermore, line 1204 of the difference program configuration information 1800 describes that priority is 4 (program configuration information selection condition).

Furthermore, line 1205 and line 1206 of the difference program configuration information 1800 describe that contents "audio1", "video1" are added to "program2."

Furthermore, line 1207 of the difference program configuration information 1800 describes that "text2" is deleted from "program2."

Furthermore, line 1208 and line 1209 of the difference program configuration information 1800 describe that screen configuration information "layout1" is added and "layout2" is deleted.

The server 1301 may also be adapted so as to transmit program configuration information "program2" and difference program information "program3." This allows the server 1301 to reduce the amount of information of a plurality of pieces of program configuration information transmitted to the reception terminal 1303.

Figure 21:
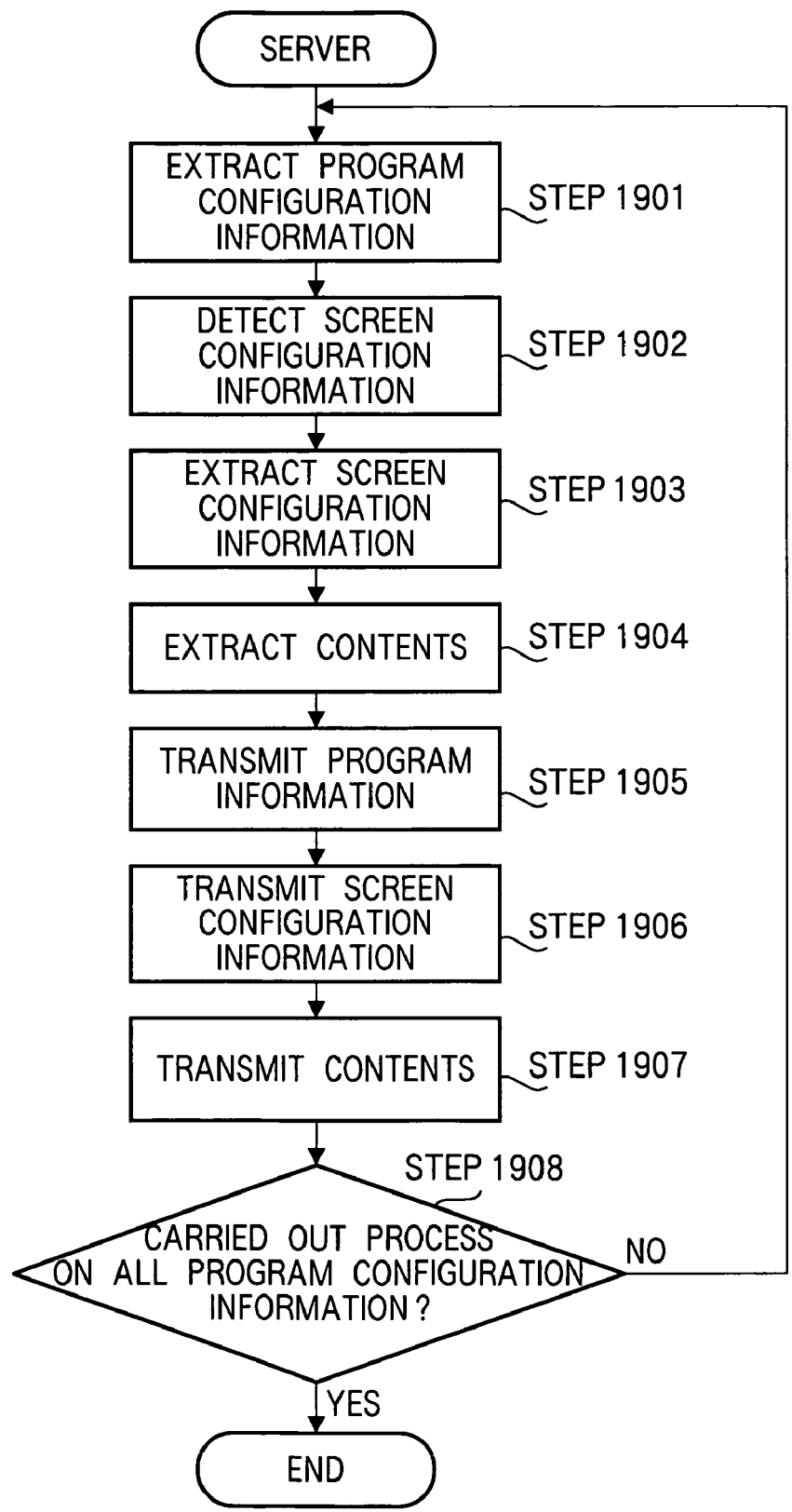
FIG. 21 is an operation flow chart of a server according to Embodiment 2.

Next, the operation of the server 1301 transmitting program configuration information, screen configuration information and contents will be explained using FIG. 21. FIG. 21 is an operation flow chart of the server according to Embodiment 2.

First, the transmission control section 1302 of the server 1301 extracts the program configuration information from a program configuration information storage section 105 of a data control section 102 (step 1901).

Next, the transmission control section 1302 references the extracted program configuration information and detects the screen configuration information described in the program configuration information (step 1902). Then, the transmission control section 1302 extracts the detected screen configuration information from a screen configuration information storage section 106 (step 1903).

Next, the transmission control section 1302 extracts contents such as video, still image, character described in the program information extracted in step 1901 from a video storage section 107, still image storage section 108 and character storage section 109 (step 1904).

Next, the transmission control section 1302 transmits the program configuration information extracted in step 1901 to the reception terminal 1303 through the transmission section 104 (step 1905). Next, the transmission control section 1302 transmits the screen configuration information described in the program configuration information extracted in step 1903 to the reception terminal 1303 through the transmission section 104 (step 1906). Then, the transmission control section 1302 transmits the contents extracted in step 1904 to the reception terminal 1303 through the transmission section 104 (step 1907).

Then, the transmission control section 1302 carries out processes in step 1901 to step 1907 on all program configuration information to be transmitted (step 1908).

When the program configuration information extracted in step 1901 is difference information, the transmission control section 1302 extracts the difference program information.

In this way, the server 1301 transmits a plurality of pieces of program configuration information, image configuration information described in them and contents to the reception terminal 1303.

Figure 22:
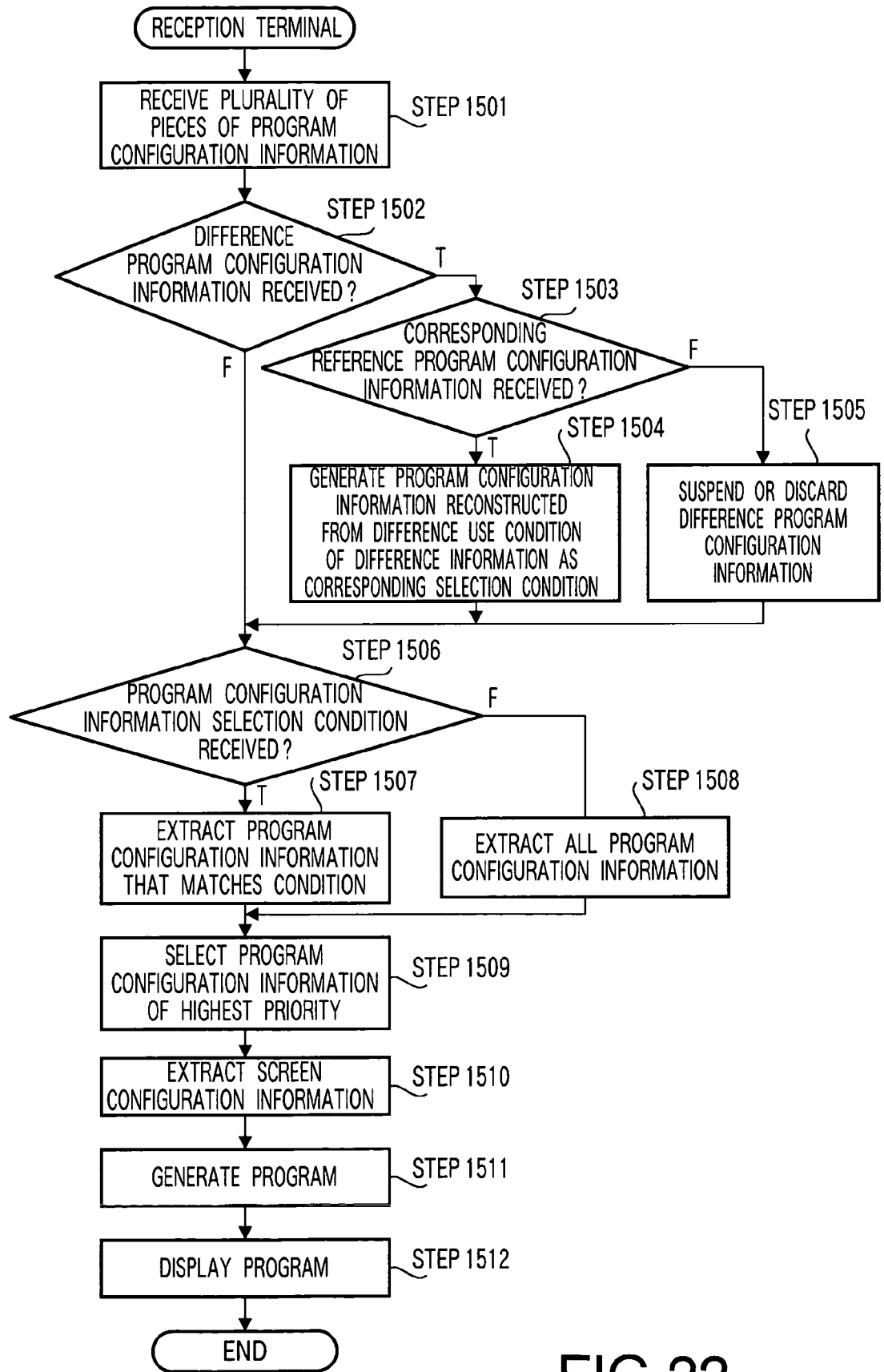
FIG. 22 is a flow chart of the operation of the reception terminal according to Embodiment 2.

Next, the operation of the reception terminal 1303 according to Embodiment 2 will be explained using FIG. 22. FIG. 22 is a flow chart of the operation of the reception terminal 1303 according to Embodiment 2.

First, the reception terminal 1303 receives various types of data at a reception section 202. Next, the program configuration information extraction section 203 extracts a plurality of pieces of program configuration information from the received various types of data and sends them to the program configuration information generation section 1408 (step 1501).

Next, when the program configuration information generation section 1408 discovers difference program configuration information in the plurality of pieces of program configuration information transmitted (step 1502), the program configuration information generation section 1408 checks whether the reference program configuration information corresponding to the difference program configuration information has been received or not (step 1503).

Taking FIG. 20 as an example, when "program3" has been received, it is known from line 1202 that "program3" is difference information relative to "program2", and therefore the program configuration information generation section 1408 checks whether "program2" has been received or not.

When the reference program configuration information ("program2") has been received, the program configuration information generation section 1408 reconstructs the difference and generates program configuration information ("program1" is generated in the example in FIG. 20).

Next, the program configuration information generation section 1408 uses the condition (line 1203) described in the difference information as the program configuration information selection condition for the program configuration information generated (step 1504). The program configuration information selection condition is extracted by the program configuration information condition extraction section 1404.

On the other hand, when the reference program configuration information corresponding to the difference program configuration information has not been received, the program configuration information generation section 1408 suspends or discards the difference program configuration information until the reference program configuration information ("program2") can be received (step 1505).

Next, the program configuration information generation section 1408 checks whether the program configuration information selection condition has been received or not (step 1506).

Embodiment 2 assumes that the program configuration information selection condition is included in the program configuration information, but the program configuration information selection condition need not be described in the program configuration information. In this case, the program configuration information selection condition may be transmitted using a different transmission method or may not be transmitted at all. When it is not transmitted, the program may be configured using the program configuration information which the reception terminal has received without any loss.

Next, when the program configuration information selection condition has been received, the program configuration information generation section 1408 extracts the program configuration information that matches the condition (step 1507).

Since the program configuration information selection condition indicates the transmission condition of the reception terminal 1303, this allows the reception terminal 1303 to select program configuration information appropriate for the transmission condition.

Furthermore, when the program configuration information selection condition has not been received, the program configuration information generation section 1408 extracts all the received program configuration information (step 1508).

When there is a plurality of pieces of extracted program configuration information, the program configuration information generation section 1408 selects the program configuration information having the highest priority added (step 1509).

Priority is higher for information which should be displayed more preferably. The program configuration information describes priority information, and therefore even when there are a plurality of pieces of program configuration information that match the program configuration information selection condition under the transmission condition, the reception terminal 1303 can select program configuration information which should be displayed preferably.

Next, the program configuration information generation section 1408 sends the selected program configuration information to the screen configuration information extraction section 1409.

The screen configuration information extraction section 1409 extracts the screen configuration information described in the program configuration information transmitted and sends it to the program display control section 209 (step 1510).

Next, the program display control section 209 selects contents described in the screen configuration information transmitted from the contents extracted by the contents extraction section 206. Next, the program display control section 209 generates a program using the screen configuration information transmitted and selected contents and outputs the program to a program display section 210 (step 1511).

Then, the program display section 210 displays the program transmitted (step 1512).

In this way, the reception terminal 1303 selects program configuration information appropriate for the own terminal from the plurality of pieces of program configuration information received and can generate and display a program using the program configuration information appropriate for the own terminal.

In Embodiment 2, when the reception terminal 1303 receives layout2, layout3 in FIG. 10 and program configuration information in FIG. 11, it is possible to replace the portion of the video display area 613 shown in FIG. 8 by the character display area 623 and display characters as shown in FIG. 14.

Furthermore, Embodiment 2 is likewise applicable when the display screen size of the reception terminal 1303 is different. By describing "a=terminal:pc", "a=terminal:pda" instead of "a=bandwidth: . . ." (e.g., line 1002 in FIG. 18) of the program configuration information selection condition, it is possible to specify the screen configuration information for a personal computer, screen configuration information for a PDA. Furthermore, instead of the description such as "pc" and "pda" indicating the type of terminal, it is also possible to directly describe the screen size, for example, as "a=terminal: 640×480."

The reception terminal 1303 interprets these descriptions and specifies program configuration information, and even when the reception terminal 1303 has a small display screen 601 as shown in FIG. 15, it is possible to select screen configuration information appropriate for the size and display the program.

It is also possible to implement the processes carried out by the server 1301 and reception terminal 1303 by a program, store the program in a storage medium and cause a general-purpose computer to read and execute this program.

This application is based on the Japanese Patent Application No. 2003-065670 filed on Mar. 11, 2003, entire content of which is expressly incorporated by reference herein.

Industrial Applicability

As described above, even when a transmission band varies from one reception terminal to another and in a transmission environment such as broadcasting in which the type of contents that can be received also varies, it is possible to display deteriorated contents and prevent an amount of information displayed from reducing by changing screen configuration information so that only contents that can be displayed are displayed according to the transmission band.

Furthermore, by changing screen configuration information according to the size of the screen of the reception terminal, it is possible to specify and display screen configuration information that matches the screen size and obtain the effect of avoiding the problem that the contents stick out of a small screen and the whole contents cannot be displayed or that contents can only be displayed within a small range on a large screen.

What is claimed is:

1. A method for broadcasting content, by a broadcasting server, to one or more mobile terminals, comprising:
storing, by the broadcasting server, content, and a plurality of program configuration information, each program configuration information including a screen arrangement of the content, the screen arrangement indicating which of a plurality of media including video, text and still images is to be played as program content and respective display positions of the plurality of media to be played on a screen of the one or more mobile terminals; and
broadcasting, by the broadcasting server, the content and the plurality of program configuration information to the one or more mobile terminals, without receiving from the one or more mobile terminals, a request for selection of one program configuration information, wherein the plurality of program configuration information are associated with respective transmission bands, upon receiving the content and the plurality of program configuration information, one program configuration information is selected at each mobile terminal based on a transmission condition and without sending a request for selection of the one program configuration information to the broadcasting server, and the plurality of program configuration information are configured such that display on the screen at each mobile terminal is performed based on the selected program configuration information without further communicating with the broadcasting server.

2. A method for receiving, at one or more mobile terminals, content broadcast from a broadcasting server, comprising:

receiving content, and a plurality of program configuration information associated with respective transmission bands, each program configuration information including a screen arrangement of the content, the screen arrangement indicating which of a plurality of media including video, text and still images is to be played as program content, and respective display positions of the media to be played on a screen of the one or more mobile terminals;

selecting, upon receiving the content and the plurality of program configuration information, at each mobile terminal, without sending a request for selection of one program configuration information to the broadcasting server, program configuration information that is associated with an appropriate transmission band, from the plurality of program configuration information, based on a transmission condition; and displaying on the screen, at each mobile terminal, the received content based on the selected program configuration information without further communicating with the broadcasting server.

3. The receiving method according to claim 2, wherein the selecting comprises selecting program configuration information corresponding to a higher priority based on the transmission condition.

4. The method receiving according to claim 2, wherein the selecting comprises selecting program configuration information corresponding to a higher bit rate based on the transmission condition.

5. A method for broadcasting content from a broadcasting server to one or more mobile terminals, comprising:

storing, by the broadcasting server, content, and a plurality of program configuration information, each program configuration information including a screen arrangement of the content, the screen arrangement indicating which of a plurality of media including video, text and still images is to be played as program content, and respective display positions of the plurality of media to be played on a screen of the one or more mobile terminals;

broadcasting, by the broadcasting server, the content and the plurality of program configuration information to the mobile terminals, without receiving from the one or more mobile terminals, a request for selection of one program configuration information;

receiving, at each mobile terminal, the content, and the plurality of program configuration information associated with respective transmission bands;

selecting, upon receiving the content and the plurality of program configuration information, at each mobile terminal, without sending a request for selection of the one program configuration information to the broadcasting server, program configuration information that is associated with an appropriate transmission band, from the plurality of program configuration information, based on a transmission condition; and displaying on the screen, at each mobile terminal, the received content based on the selected program configuration information without further communicating with the broadcasting server.

6. The broadcasting method according to claim 5, wherein the selecting comprises selecting program configuration information corresponding to a higher priority based on the transmission condition.

7. The broadcasting method according to claim 5, wherein the selecting comprises selecting program configuration information corresponding to a higher bit rate based on the transmission condition.

8. A transmission apparatus, provided in a broadcasting server, for broadcasting content to one or more mobile terminals, comprising:

a program configuration information storage that stores content, and a plurality of program configuration information, each program configuration information including a screen arrangement of the content, the screen arrangement indicating which of a plurality of media, including video, text and still images is to be played as program content and respective display positions of the plurality of media to be played on a screen of the one or more mobile terminals; and a transmitter configured to broadcast the content and the plurality of program configuration information to the one or more mobile terminals, without receiving from the one or more mobile terminals, a request for selection of one program configuration information, wherein:

the plurality of program configuration information are associated with respective transmission bands, upon receiving the content and the plurality of program configuration information, one program configuration information is selected at each mobile terminal based on a transmission condition and without sending a request for selection of the one program configuration information to the broadcasting server, and the plurality of program configuration information are configured such that display on the screen at each mobile terminal is performed based on the selected program configuration information without further communicating with the broadcasting server.

9. A reception apparatus, provided in one or more mobile terminals, for receiving content broadcast from a broadcasting server, comprising:

a receiver configured to receive content, and a plurality of program configuration information associated with respective bands, each program configuration information including a screen arrangement of the content, the screen arrangement indicating which of a plurality of media including video, text and still images is to be played as program content, and respective display positions of the plurality of media to be played on a screen of the one or more mobile terminals;

a selector configured to select, upon a receipt of the content and the plurality of program configuration information by the receiver, at each mobile terminal, without sending a request for selection of one program configuration information to the broadcasting server, program configuration information that is associated with an appropriate transmission band, from the plurality of program configuration information, based on a transmission condition; and a display configured to display on the screen, at each mobile terminal, the received content based on the selected program configuration information without further communicating with the broadcasting server.

10. The reception apparatus according to claim 9, wherein the selector is configured to select program configuration information corresponding to a higher priority based on the transmission condition.

11. The reception apparatus according to claim 9, wherein the selector is configured to select program configuration information corresponding to a higher bit rate based on the transmission condition.

12. A broadcast system for broadcasting content from a broadcasting server to one or more mobile terminals, the broadcasting server comprising:

a program configuration information storage that stores content, and a plurality of program configuration information, each program configuration information including a screen arrangement of the content, the screen arrangement indicating which of a plurality of media including video, text and still images is to be played as program content, and respective display positions of the plurality of media to be played on a screen of the one or more mobile terminals; and a transmitter configured to broadcast the content and the plurality of program configuration information to the mobile terminals, without receiving from the one or more mobile terminals, a request for selection of one program configuration information, each mobile terminal of the one or more mobile terminals comprising:

a receiver configured to receive the content and the plurality of program configuration information associated with respective transmission bands;

a selector configured to select, upon a receipt of the content and the plurality of program configuration information by the receiver, at each mobile terminal, without sending a request for selection of the one program configuration information to the broadcasting server, program configuration information that is associated with an appropriate transmission band, from the plurality of program configuration information, based on a transmission condition; and a display configured to display on the screen, at each mobile terminal, the received content based on the selected program configuration information without further communicating with the broadcasting server.

13. The broadcast system according to claim 12, wherein the selector is configured to select program configuration information corresponding to a higher priority based on the transmission condition.

14. The broadcast system according to claim 12, wherein the selector is configured to select program configuration information corresponding to a higher bit rate based on the transmission condition.

15. The broadcasting method according to claim 1, wherein the selection of one of the plurality of program configuration information is by unidirectional communication.

16. The receiving method according to claim 2, wherein the selecting of program configuration information is by unidirectional communication.

17. The broadcasting method according to claim 5, wherein the selecting of one of the plurality of program configuration information is by unidirectional communication.

18. The transmission apparatus according to claim 8, wherein the selection of program configuration information is by unidirectional communication.

19. The reception apparatus according to claim 9, wherein the selector selects program configuration information by unidirectional communication.

20. The broadcast system according to claim 12, wherein the selector selects program configuration information by unidirectional communication.

* * * * *

UNITED STATES PATENT AND TRADEMARK OFFICE
CERTIFICATE OF CORRECTION

| | |
|---|---|
| PATENT NO. | : 8,214,458 B2 |
| APPLICATION NO. | : 10/548081 |
| DATED | : July 3, 2012 |
| INVENTOR(S) | : Junichi Sato et al. |

It is certified that error appears in the above-identified patent and that said Letters Patent is hereby corrected as shown below:

On the Title Page, at Item (75) Inventors, of the printed patent, "Junichi Sato, Machida (JP)" should read --Junichi Sato, Tokyo (JP)--.

On the Title Page, at Item (75) Inventors, of the printed patent, "Takao Yamaguchi, Neyagawa (JP)" should read --Takao Yamaguchi, Osaka (JP)--.

Signed and Sealed this
Thirtieth Day of October, 2012

David J. Kappos
*Director of the United States Patent and Trademark Office*